United States Patent
Kawanaka et al.

(10) Patent No.: US 8,751,842 B2
(45) Date of Patent: Jun. 10, 2014

(54) MICROCONTROLLER AND METHOD OF CONTROLLING THE SAME

(75) Inventors: Yosuke Kawanaka, Kanagawa (JP); Seiya Indo, Kanagawa (JP); Tomoya Katsuki, Kanagawa (JP); Shinichi Nakatsu, Kanagawa (JP); Kimiharu Eto, Kanagawa (JP); Hirotaka Shimoda, Kanagawa (JP); Kuniyasu Ishihara, Kanagawa (JP); Yuusuke Urakawa, Kanagawa (JP); Yuusuke Sakaguchi, Kanagawa (JP); Shingo Furuta, Kanagawa (JP)

(73) Assignee: Renesas Electronics Corporation, Kawasaki, Kanagawa (JP)

( * ) Notice: Subject to any disclaimer, the term of this patent is extended or adjusted under 35 U.S.C. 154(b) by 425 days.

(21) Appl. No.: 13/067,176

(22) Filed: May 13, 2011

(65) Prior Publication Data

US 2011/0285429 A1 Nov. 24, 2011

(30) Foreign Application Priority Data

May 21, 2010 (JP) .................................. 2010-117707
Mar. 31, 2011 (JP) .................................. 2011-079471

(51) Int. Cl.
*G06F 1/32* (2006.01)

(52) U.S. Cl.
USPC ............ 713/323; 713/322; 713/324; 713/502

(58) Field of Classification Search
USPC ......................................... 713/322–324, 502
See application file for complete search history.

(56) References Cited

U.S. PATENT DOCUMENTS

| | | | | |
|---|---|---|---|---|
| 4,556,850 A | * | 12/1985 | McBrien | .......................... 377/75 |
| 5,365,047 A | | 11/1994 | Yamaguchi | |
| 6,754,839 B1 | * | 6/2004 | Wegner | .......................... 713/500 |
| 7,543,163 B2 | * | 6/2009 | Kernahan et al. | ............. 713/300 |
| 7,734,942 B2 | * | 6/2010 | Dahlen et al. | ................. 713/323 |
| 7,876,144 B2 | * | 1/2011 | Hashimoto et al. | ........... 327/296 |

FOREIGN PATENT DOCUMENTS

| | | | |
|---|---|---|---|
| JP | 5-342435 A | 12/1993 | |
| JP | 2003-186863 A | 7/2003 | |
| JP | 2004-246793 A | 9/2004 | |
| JP | 2007-58347 A | 3/2007 | |

OTHER PUBLICATIONS

English translation of JP 2007-058347 A, published on Mar. 8, 2007.*
English translation of JP 2004-246793 A, published on Sep. 2, 2004.*

* cited by examiner

*Primary Examiner* — Thuan Du
(74) *Attorney, Agent, or Firm* — McGinn IP Law Group, PLLC

(57) ABSTRACT

A microcontroller includes a data input unit that receives input data and outputs a start request signal according to the input data upon receiving the input data; an oscillator that starts according to the start request signal, to generate a clock signal; a clock signal supply control unit that outputs the start request signal supplied from the data input unit to the oscillator, and supplies the clock signal supplied from the oscillator generated after the start as a first clock signal and a second clock signal that are operation clock signals of the data input unit; and a CPU that operates the second clock signal as an operation clock, and performs processing according to the input data when the second clock signal is operated.

28 Claims, 25 Drawing Sheets

| | FREQUENCY ACCURACY | OSCILLATION STABLE TIME | RESULTS |
|---|---|---|---|
| CR OSCILLATOR | LOW | SHORT | FREQUENCY ACCURACY IS LOW, AND BAUD RATE ERROR IS LARGE |
| CRYSTAL OSCILLATOR | HIGH | LONG | OSCILLATION STABLE TIME IS LONG, AND OSCILLATION CANNOT BE MADE STABLE BEFORE FIRST DATA SAMPLING START PERIOD |
| CHIP-EMBEDDED OSCILLATOR | HIGH | SHORT | FREQUENCY ERROR IS ABOUT ±2% OR LESS, AND OSCILLATION STABLE TIME IS WITHIN FIRST SAMPLING START PERIOD |

Fig. 7

MICROCONTROLLER AND METHOD OF CONTROLLING THE SAME

CROSS-REFERENCE TO RELATED APPLICATIONS

This application is based upon and claims the benefit of priority from Japanese patent application Nos. 2010-117707, filed on May 21, 2010, and 2011-79471, filed on Mar. 31, 2011, the disclosure of which is incorporated herein in its entirety by reference.

BACKGROUND

The present invention relates to a microcontroller and a method of controlling the same.

In recent years, there has been an increasing demand to reduce power consumption in electronic devices. For example, in a microcontroller that mounts a UART communication function, as shown in an operation timing chart in FIG. 22, a chip state must be constantly set to RUN to receive UART data that is supplied at arbitrary timings. In short, a clock supply to a UART data receiving unit for receiving data and to a CPU to process the received data is constantly required. As a result, high electric power is consumed regardless of whether to receive the UART data.

An example to solve such a problem is a technique as disclosed in Japanese Unexamined Patent Application Publication No. 2007-58347. FIG. 23 is a block diagram of a reception system 1 of UART data disclosed in Japanese Unexamined Patent Application Publication No. 2007-58347. As shown in FIG. 23, the reception system 1 includes a data reception unit 2, a clock signal supply control means 3, an oscillator 4, an interruption control unit 5, and a CPU 6. The data reception unit 2 includes a FIFO memory 7.

Upon detection of a start bit of a reception signal during HALT (power saving period), the data reception unit 2 starts data reception of the UART data. Further, upon detecting the start bit, the data reception unit 2 supplies a start request signal to the clock signal supply control means 3, and an interruption signal to the interruption control unit 5. Accordingly, a clock signal is supplied to the interruption control unit 5 and the CPU 6, thereby the interruption control unit 5 and the CPU 6 start the operations.

Since the oscillator 4 does not stop even in the HALT period, the data reception unit 2 operates according to the clock signal through the clock signal supply control means 3. The data reception unit 2 stores, in the FIFO memory 7, the UART data that is received upon receiving the clock signal as the operation clock.

Upon receiving the start request signal from the data reception unit 2, the clock signal supply control means 3 supplies the clock signal to the interruption control unit 5 and the CPU 6.

Upon receiving the interruption signal from the data reception unit 2, the interruption control unit 5 performs arbitration with an interruption signal supplied from another peripheral circuit, and then outputs the interruption signal to the CPU 6.

When the clock supply is re-started, the CPU 6 reads out all the data in the FIFO memory 7 of the data reception unit 2. Then, the CPU 6 directly reads out the UART data in a reception buffer of the data reception unit 2. According to such an operation, the CPU 6 is able to process all the UART data received by the reception system 1.

FIG. 24 shows a flow chart for describing an operation of the reception system 1. First, in HALT (power saving period) (YES in S1), the clock signal is supplied to the data reception unit 2, and the supply of the clock signal to the CPU 6 is stopped (S2). When the data reception unit 2 starts receiving the UART data, the start request signal is transmitted to the clock signal supply control means 3 (YES in S3), and the clock signal is supplied to the CPU 6 (S4).

FIG. 25 shows an operation timing chart of the reception system 1. As shown in FIG. 25, before time t1, the state of the chip in which the reception system 1 is formed is HALT. In this state, the clock signal is not supplied to the interruption control unit 5 and the CPU 6, and the power consumption is reduced compared with the case in which the normal operation is performed as shown in FIG. 22.

At time t1, when the UART data is received, the clock signal is supplied to the interruption control unit 5 and the CPU 6, and the interruption control unit 5 and the CPU 6 start operations. Accordingly, the chip state becomes the RUN state.

After time t2 in which the UART data is not transmitted, the chip state becomes HALT. In this state, as is similar to time before time t1, the clock signal is not supplied to the interruption control unit 5 and the CPU 6, thereby reducing the power consumption.

Other related arts include Japanese Unexamined Patent Application Publication Nos. 2004-246793, 5-342435, and 2003-186863. Japanese Unexamined Patent Application Publication No. 2004-246793 discloses a technique in which an oscillation controller controls a crystal oscillator by an oscillation enable signal, and the crystal oscillator stops when the oscillation enable signal becomes a low level. Further, Japanese Unexamined Patent Application Publication No. 5-342435 discloses a technique in which the UART transmits a re-transmission request signal when a parity error is detected, thereafter the UART stops the operation, and the UART signal becomes the low level, which indicates a wait state. Further, Japanese Unexamined Patent Application Publication No. 2003-186863 discloses a technique to judge an input of a reception input signal different from any basic pattern before detecting reception completion by counting a predetermined number of bits as abnormal.

SUMMARY

As described above, as shown in FIG. 25, in the reception system 1 according to the prior art, before time t1 and after time t2, power consumption can be reduced. However, in the reception system 1, the oscillator 4 constantly continues the operation even when the chip state is HALT. In recent years, there has been a growing need to reduce power consumption in electronic devices. Along with this need, a mechanism is required to reduce power consumption in a microcontroller chip as much as possible.

A first aspect of an embodiment of the present invention is a microcontroller including: a data input unit that receives input data and outputs a start request signal according to the input data upon receiving the input data; an oscillator that starts according to the start request signal, to generate a clock signal; a clock signal supply control unit that outputs the start request signal supplied from the data input unit to the oscillator, and supplies the clock signal supplied from the oscillator generated after the start as a first clock signal and a second clock signal that are operation clock signals of the data input unit; and a CPU that operates the second clock signal as an operation clock, and performs processing according to the input data when the second clock signal is operated.

A second aspect of an embodiment of the present invention is a method of controlling a microcontroller that includes an oscillator, a data input unit that receives input data, and a CPU that performs processing according to the input data, the method including: outputting, by the data input unit, a start request signal according to the input data, when the input data is supplied; starting the oscillator according to the start request signal, to generate a clock signal; operating the data input unit by a first clock signal according to the clock signal generated by the oscillator; and supplying a second clock signal according to the clock signal generated by the oscillator to the CPU as an operation clock when the data input unit normally completes the operation, to perform processing according to the input data when the CPU is operated.

The microcontroller according to the present invention stops the operation until when the oscillator that generates the clock signal receives the start request signal output from the data input unit. Thus, in the state in which there is no input data, the oscillator does not generate the clock signal, and the CPU stops the operation as well. Accordingly, power consumption in the state in which there is no input data can be reduced to a minimum amount to keep the operation.

According to the present invention, power consumption of a microcontroller can be reduced.

BRIEF DESCRIPTION OF THE DRAWINGS

The above and other aspects, advantages and features will be more apparent from the following description of certain embodiments taken in conjunction with the accompanying drawings, in which:

FIG. 7 is a table for describing a preferable condition for an oscillator according to the first embodiment of the present invention;

DETAILED DESCRIPTION

First Embodiment

Figure 1:
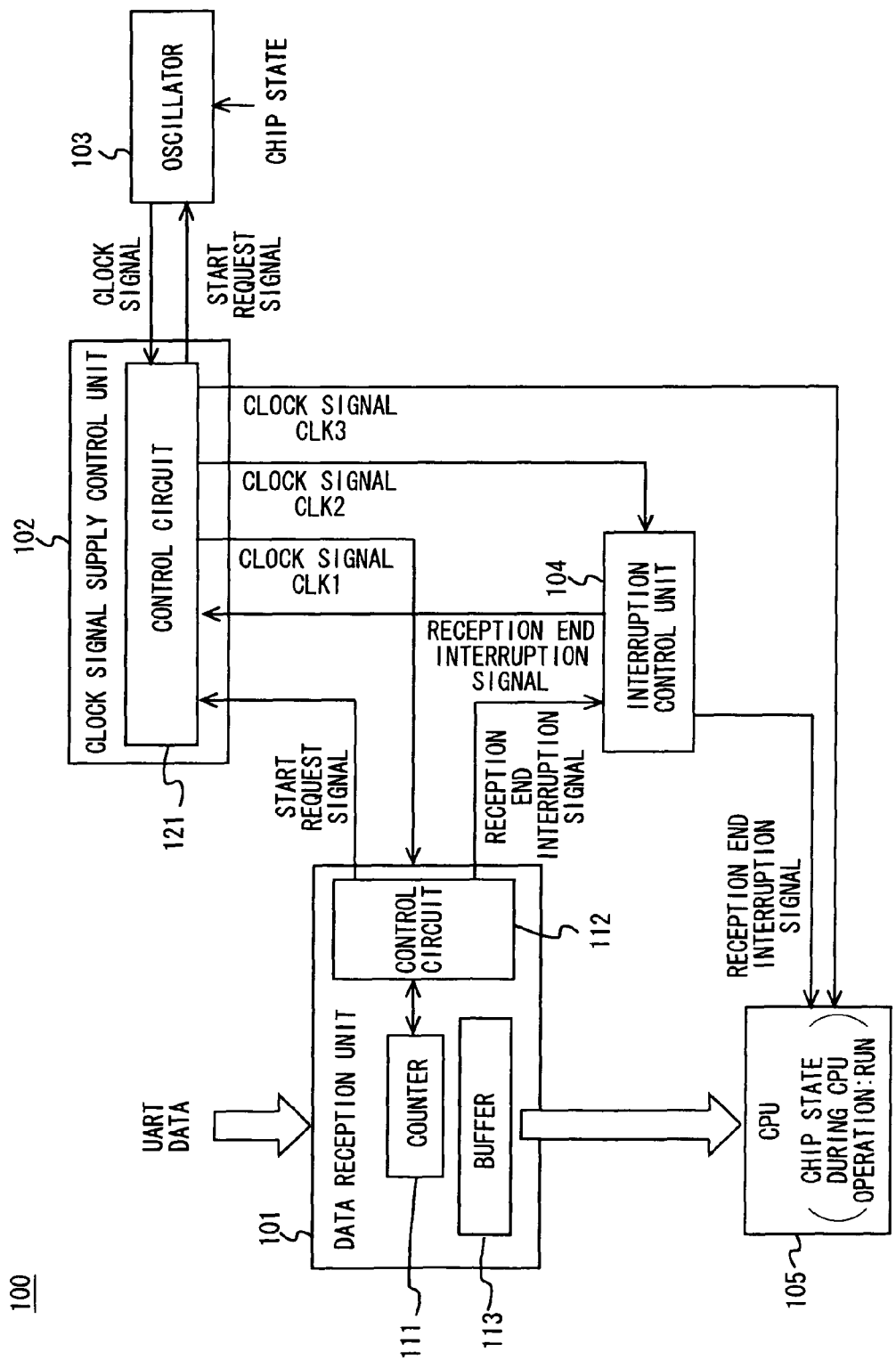
FIG. 1 is a block configuration of a microcontroller according to a first embodiment of the present invention.

Hereinafter, a specific first embodiment of the present invention is described in detail with reference to the accompanying drawings. In the first embodiment, the present invention is applied to a microcontroller including a reception system of UART. FIG. 1 shows a block configuration of a microcontroller 100 according to the first embodiment of the present invention.

As shown in FIG. 1, the microcontroller 100 includes a data reception unit 101, a clock signal supply control unit 102, an oscillator 103, an interruption control unit 104, and a CPU 105.

The data reception unit 101 includes a counter 111, a control circuit 112, and a reception buffer 113. The data reception unit 101 starts reception of UART data, and upon detection of a start bit, outputs a start request signal to the clock signal supply control unit 102. Further, when normally completes reception of UART data, the data reception unit 101 outputs a reception end interruption signal to the interruption control unit 104. However, upon occurrence of a reception error of the UART data, it stops the output of the start request signal to the clock signal supply control unit 102.

Further, the data reception unit 101 corrects an error of a sampling timing occurred by an oscillation stable time of the oscillator 103 using the counter 111.

The oscillator 103 starts the operation upon receiving the start request signal from the clock signal supply control unit 102, and supplies a clock signal to the clock signal supply control unit 102. Further, when the start request signal from the clock signal supply control unit 102 is stopped, the operation is stopped if the chip state is STOP. Thus, the supply of the clock signal to the clock signal supply control unit 102 is also stopped.

Note that the chip state includes RUN, STOP, and SNOOZE. When the chip state is RUN, the clock signal is supplied to the CPU 105, the data reception unit 101, and the interruption control unit 104, and each of them operates according to the clock signal. Further, when the chip state is STOP, the oscillator 103 is stopped, and the clock signal is not supplied to the data reception unit 101, the interruption control unit 104, and the CPU 105. When the chip state is SNOOZE, the clock signal is not supplied to the CPU 105, but is supplied to the data reception unit 101 and the interruption control unit 104.

The clock signal supply control unit 102 includes a control circuit 121. When receiving the start request signal from the data reception unit 101, the clock signal supply control unit 102 outputs the start request signal to the oscillator 103. As described above, the oscillator 103 starts according to the start request signal, and the oscillator 103 starts supply of the clock signal after the start. Then, the clock signal supply control unit 102 supplies the clock signal supplied from the oscillator 103 to the data reception unit 101 and the interruption control unit 104 as clock signals CLK1 and CLK2, respectively. Then, upon receiving a reception end interruption signal, the clock signal supply control unit 102 starts the supply of a clock signal CLK3 to the CPU 105. Inputs and outputs of each of the start request signal, the reception end interruption signal, and the clock signals are controlled by the control circuit 121.

The interruption control unit 104 supplies the reception end interruption signal received from the data reception unit 101 to the clock signal supply control unit 102 and the CPU 105. Note that the functions of the interruption control unit 104 may be included in the control circuit 112 of the data reception unit 101.

Upon receiving the clock signal from the clock signal supply control unit 102, the CPU 105 reads out the data held in the reception buffer 113 of the data reception unit 101, and starts processing of the UART reception data.

Figure 2:
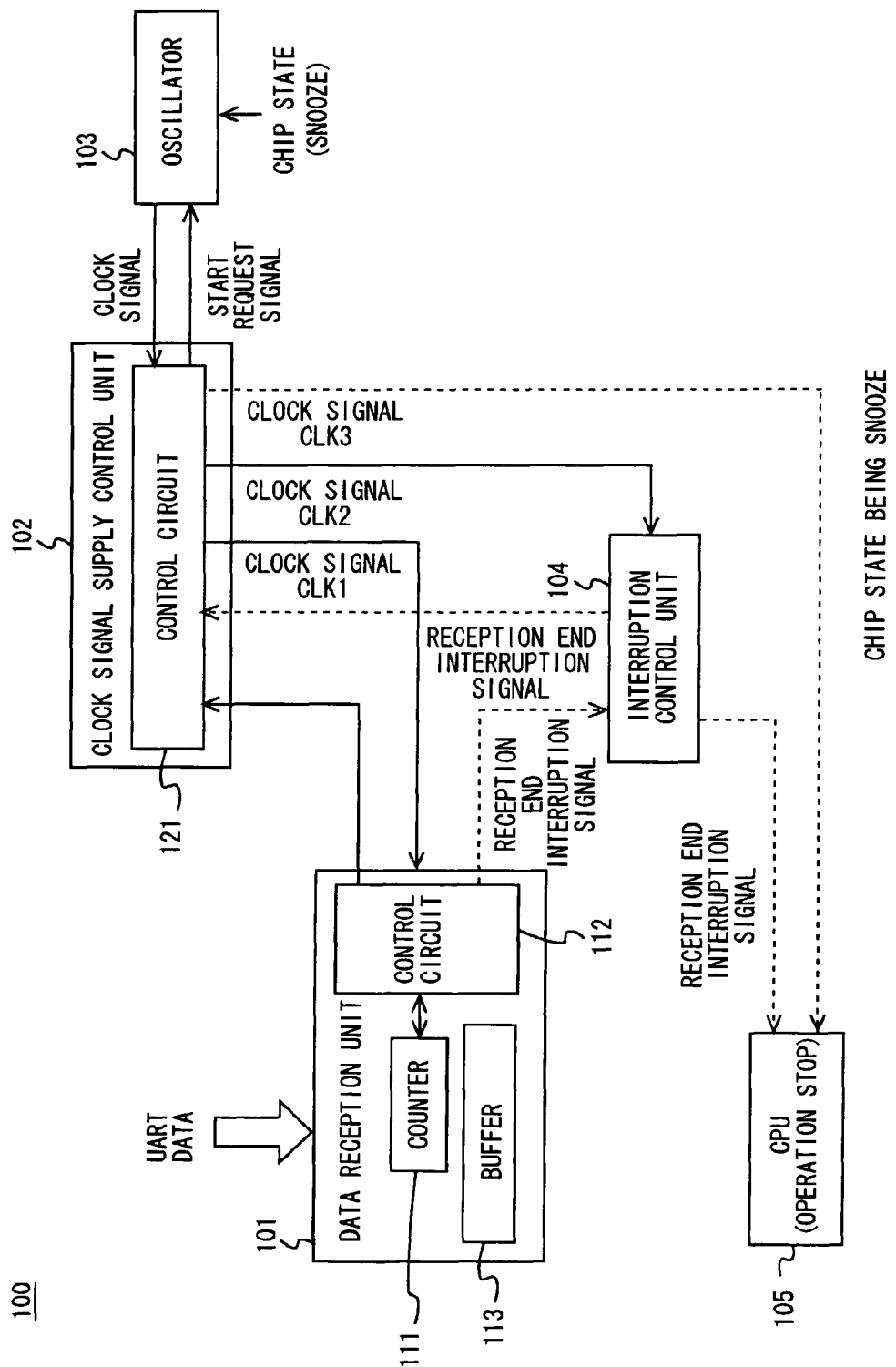
FIG. 2 is a block configuration diagram for describing an operation of the microcontroller according to the first embodiment of the present invention.
Figure 3:
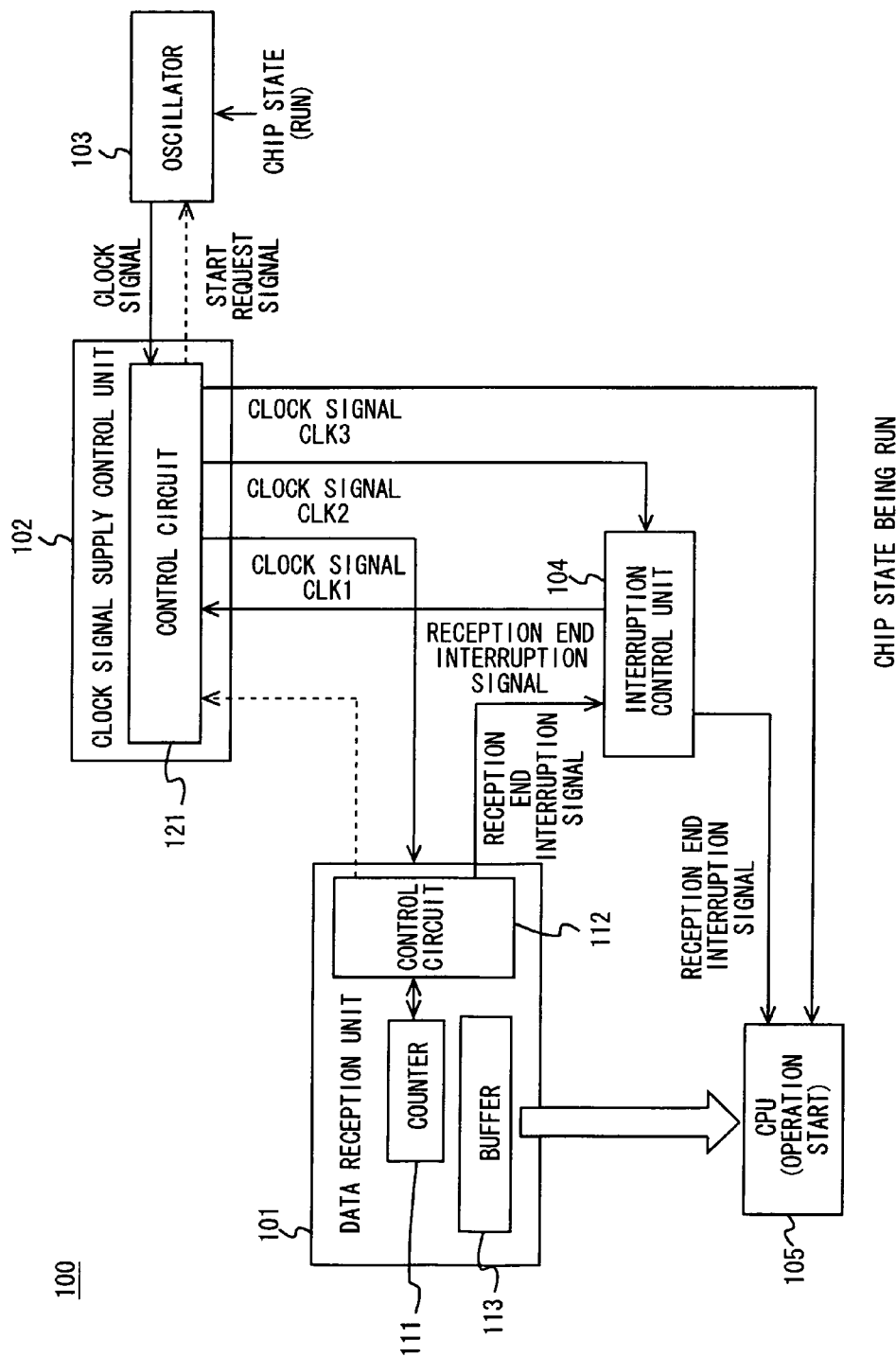
FIG. 3 is a block configuration diagram for describing the operation of the microcontroller according to the first embodiment of the present invention.

Referring to FIGS. 2 and 3, a basic operation of the microcontroller 100 is described. First, as shown in FIG. 2, upon receiving the UART data and detecting the start bit of the data, the data reception unit 101 outputs a high-level start request signal, for example. The control circuit 121 of the clock signal supply control unit 102 supplies the start request signal to the oscillator 103, and the oscillator 103 starts supply of the clock signal. Note that solid arrows in the drawings indicate that signals are input, and dotted arrows in the drawings indicate that signals are not input.

The clock signal supply control unit 102 supplies the clock signal from the oscillator 103 to the data reception unit 101 as the clock signal CLK1, and to the interruption control unit 104 as the clock signal CLK2. Then, the data reception unit 101 starts the operation upon receiving the clock signal CLK1 as the operation clock, and the interruption control unit 104 starts the operation upon receiving the clock signal CLK2 as the operation clock.

As shown in FIG. 2, while the oscillator 103 starts the operation and the clock signal is supplied to the data reception unit 101 and the interruption control unit 104, the clock signal is not supplied to the CPU 105. Thus, the chip state becomes SNOOZE.

Next, as shown in FIG. 3, upon completion of reception of UART data, the data reception unit 101 outputs the reception end interruption signal to the interruption control unit 104. Further, the data reception unit 101 stops the output of the start request signal. The interruption control unit 104 supplies the reception end interruption signal from the data reception unit 101 to the CPU 105 and to the control circuit 121 of the clock signal supply control unit 102.

When the control circuit 121 of the clock signal supply control unit 102 receives the reception end interruption signal, the clock signal supply control unit 102 supplies the clock signal supplied from the oscillator 103 to the CPU 105 as the clock signal CLK3. The CPU 105 starts the operation according to the reception end interruption signal supplied from the interruption control unit 104, and processes UART data read out from the reception buffer 113 of the data reception unit 101 according to the clock signal CLK3.

Since the data reception unit 101 stops the output of the start request signal, the start request signal received by the oscillator 103 is also stopped. However, since the CPU 105 operates and the chip state is RUN, the oscillator 103 does not stop the supply of the clock signal.

When the CPU 105 completes all the processing, the CPU 105 switches the chip state to STOP. In this case, since the oscillator 103 does not receive the start request signal, the oscillator 103 stops the operation. Thus, the data reception unit 101, the interruption control unit 104, and the CPU 105 stop the operations as well, and the data reception unit 101 returns to the state before receiving the UART data.

Figure 4:
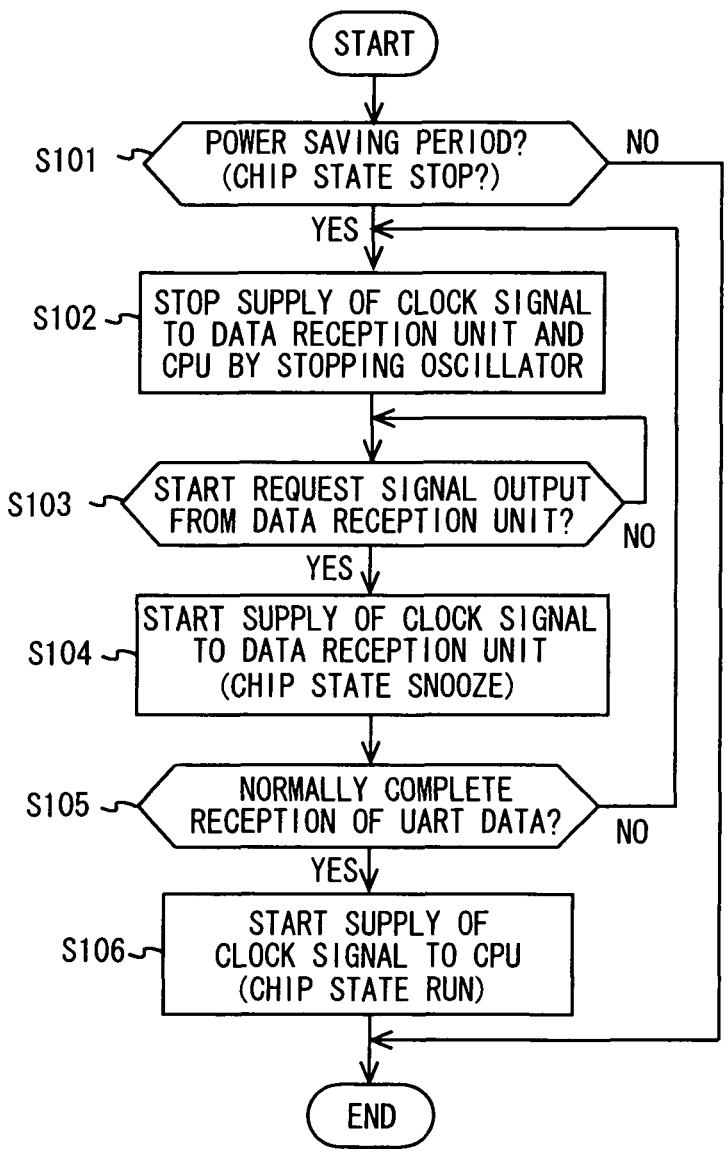
FIG. 4 is a flow chart for describing the operation of the microcontroller according to the first embodiment of the present invention.

Next, a flow chart for describing the operation of the microcontroller 100 is shown in FIG. 4. As shown in FIG. 4, in the power saving period (chip state being STOP) (YES in S101), the oscillator 103 stops, and the supply of the clock signal to the data reception unit 101, the CPU 105, and the interruption control unit 104 is stopped (S102).

When the data reception unit 101 receives the UART data, and the start request signal is supplied (YES in S103), the supply of the clock signal to the data reception unit 101 and the interruption control unit 104 is started (S104). In this state, the clock signal is not supplied to the CPU 105, and thus the chip state is SNOOZE.

When the data reception unit 101 normally completes the reception of the UART data (YES in S105), the supply of the clock signal to the CPU 105 is started (S106). In short, the chip state becomes RUN. When the data reception unit 101 does not normally complete the reception of the UART data in step S105 (NO in S105), the supply of the clock signal to the CPU 105 is not started, and the process goes back to step S102.

Figure 5:
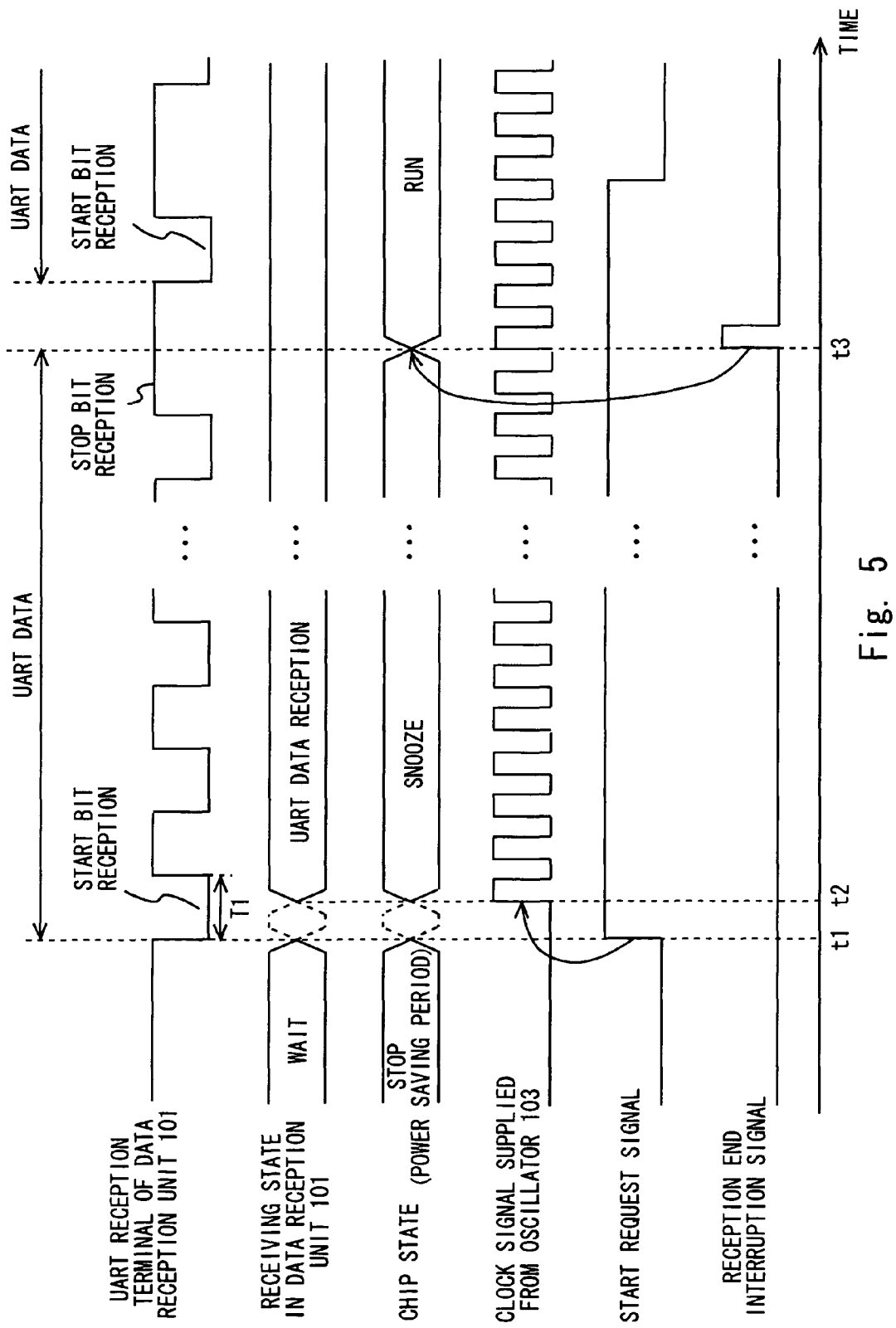
FIG. 5 is a timing chart for describing the operation of the microcontroller according to the first embodiment of the present invention.
Figure 6:
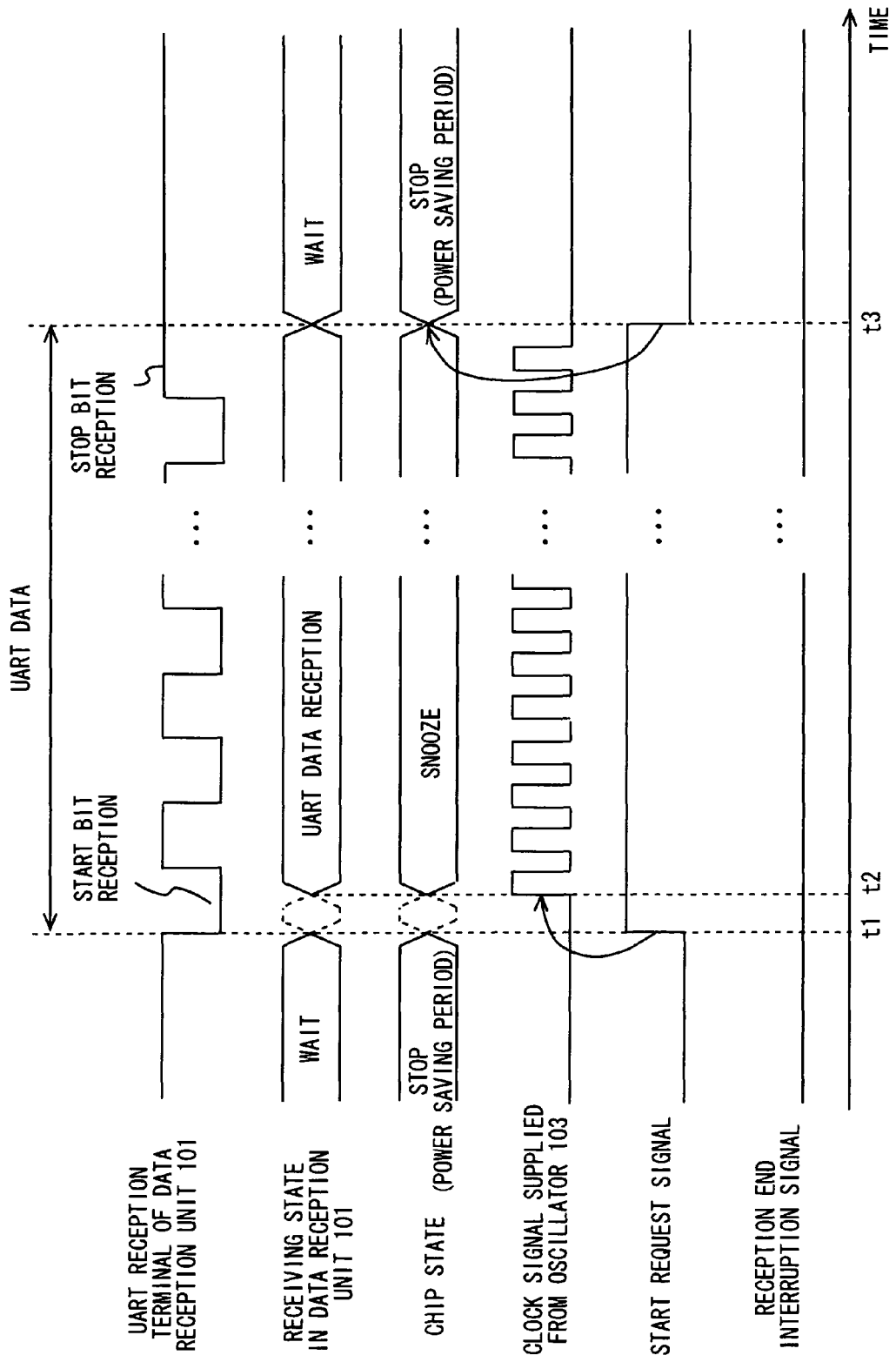
FIG. 6 is a timing chart for describing the operation of the microcontroller according to the first embodiment of the present invention.

Next, FIGS. 5 and 6 show timing charts for describing the operation of the microcontroller 100. FIG. 5 is a timing chart when the microcontroller 100 normally receives the UART data. FIG. 6 is a timing chart when the microcontroller 100 cannot normally receive the UART data and reception error is generated. First, the operation of the timing chart shown in FIG. 5 is described.

As shown in FIG. 5, before time t1, the data reception unit 101 waits for reception of the UART data in a state in which it does not receive the UART data. Thus, the chip state is the state of STOP, and the oscillator 103 does not supply the clock signal.

At time t1, the data reception unit 101 receives the UART data. Upon detection of the start bit (low level) of the UART data, the data reception unit 101 raises the start request signal from the low level to the high level. This high level start request signal is supplied to the oscillator 103, and at time t2, the oscillator 103 starts supply of the clock signal. The clock signal CLK1 is then supplied from the clock signal supply control unit 102 to the data reception unit 101. Further, the clock signal CLK2 is supplied to the interruption control unit 104.

From time t2 to t3, the data reception unit 101 starts receiving operation of the UART data upon receiving supply of the clock signal CLK1. The data reception unit 101 samples the UART data according to the timing of the clock signal CLK1.

This sampled data is held in the reception buffer 113. From time t2 to t3, the chip state becomes SNOOZE.

At time t3, when the data reception unit 101 detects the stop bit (high level) of the UART data, the reception end interruption signal is output. According to the reception interruption signal, the clock signal supply control unit 102 supplies the clock signal CLK3 to the CPU 105. The CPU 105 starts the operation according to the clock signal CLK3, so as to perform processing on the UART data of the reception buffer 113.

Described next is an operation of the timing chart shown in FIG. 6. The operation before time t2 is the same to that described in FIG. 5, and thus description is omitted here.

When the reception error of the UART data is occurred from time t2 to t3, at time t3, the data reception unit 101 stops the output of the start request signal (lowers the signal from high level to low level). Since the start request signal is stopped when the chip state is other than RUN, the oscillator 103 stops the supply of the clock signal. Accordingly, the supply of the clock signals CLK1 and CLK2 to the data reception unit 101 and the interruption control unit 104 is stopped. Thus, after time t3, the chip state becomes STOP.

The typical microcontroller outputs, upon occurrence of the reception error of the UART data, the reception error interruption signal, and performs error processing according to the reception error interruption signal. However, the microcontroller 100 according to the first embodiment does not output the reception error interruption signal and stops the start request signal, then performs the following error processing.

Further, the oscillator 103 according to the first embodiment may be a CR oscillator or a crystal oscillator connected to the microcontroller 100, or an embedded oscillator included in the microcontroller 100. FIG. 7 shows a table showing features of these oscillators. As shown in FIG. 7, while the CR oscillator has short oscillation stable time, it has low frequency accuracy. Low frequency accuracy gives an influence on the sampling of the data received by the data reception unit 101, which increases a baud rate error.

Further, as shown in FIG. 7, while the crystal oscillator has high frequency accuracy, it has long oscillation stable time. Long oscillation stable time may cause a situation in which the oscillation cannot be made stable before first data sampling performed by the data reception unit 101, which may cause a data reception error.

Last, the embedded oscillator embedded in the microcontroller 100 has high frequency accuracy with frequency error of about ±2% or less, thereby capable of reducing degradation of the baud rate error. Further, since the embedded oscillator has short oscillation stable time, the operation start of the data reception unit 101 can be within the period of the limit of the sampling start of the UART data. Thus, it will be understood that the embedded oscillator is the most preferable as the oscillator 103 according to the first embodiment. Note that the CR oscillator and the crystal oscillator may also be used depending on the specification of transmission and reception of the UART data.

Further, even when the oscillator 103 is achieved by the embedded oscillator, the sampling error of the UART data by the oscillation stable time may be occurred. This error needs to be corrected to accurately sample the UART data. The correction of the error performed by the data reception unit 101 will be described with reference to FIGS. 8 and 9. However, in the following description, the UART data transmitted or received by the microcontroller 100 is assumed to be eight bits.

Figure 8:
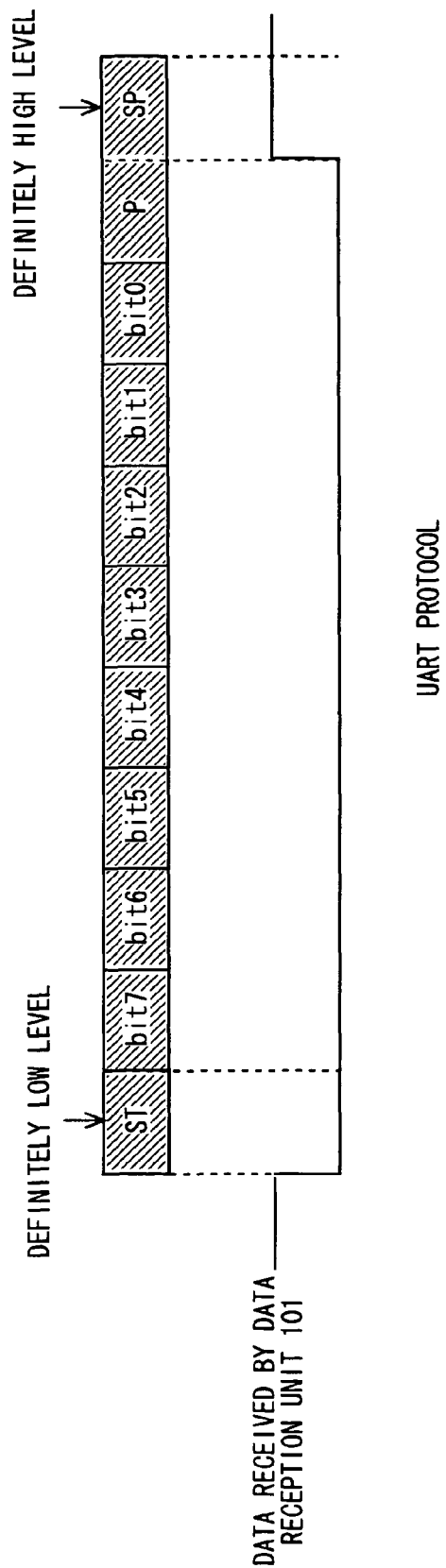
FIG. 8 is a simulation diagram for describing typical UART data.

First, FIG. 8 shows the protocol of the UART data. As shown in FIG. 8, the UART data received by the data reception unit 101 is transmitted in order of start bit (ST), bit7 to bit0, parity bit (P), and stop bit (SP) on the time axis. The start bit (ST) is definitely low level, and the stop bit (SP) is definitely high level.

For example, shown in FIG. 8 is the case in which bit7 to bit0 and parity bit (P) are all in the low level. Namely, the UART data definitely has the point of rising from the low level to the high level from the low-level start bit (ST) to the high-level stop bit (SP).

Figure 9:
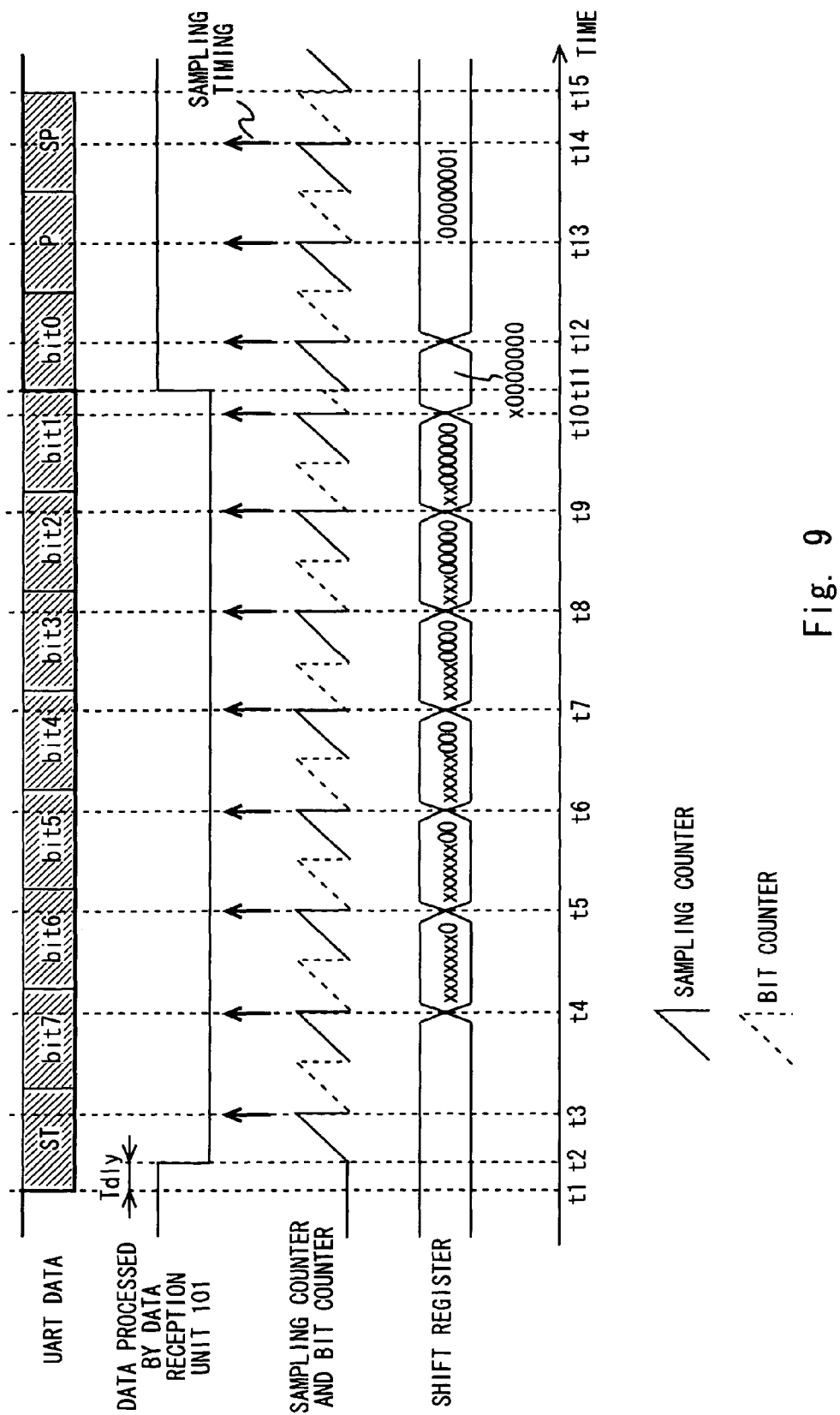
FIG. 9 is a timing chart for describing an operation of a data reception unit according to the first embodiment of the present invention.

FIG. 9 shows an operation timing chart of the data reception unit 101 according to the first embodiment of the present invention. FIG. 9 shows the UART data input to the data reception unit 101, the UART data processed in the data reception unit 101, count data counted by the counter 111, and a value stored in a shift register included in the reception buffer 113 counted by the counter 111. It is supposed that the bit7 to bit1 of the UART data supplied to the data reception unit 101 is in the low level, and bit0 and parity bit (P) are in the high level.

Further, in this example, the counter 111 includes a sampling counter and a bit counter. The sampling counter specifies the timing to sample the UART data, and the bit counter identifies which bit of data of the UART data is sampled.

At time t1, the UART data is supplied to the data reception unit 101. However, as already described above, the clock signal CLK1 is not supplied to the data reception unit 101 at this time. Thus, the sampling operation of the UART data cannot be started.

At time t2, the clock signal CLK1 is input, and the sampling operation is started. Therefore, from time t2, the sampling counter and the bit counter start operations. A delay period $Td1y$ from time t1 to t2 is influenced by the oscillation stable period of the oscillator 103 described above. Then, the data reception unit 101 samples the start bit (ST) at time t3 which is the time after time t2 by a predetermined time defined by the sampling counter. Note that it is identified which bit of data is sampled after a predetermined period specified by a bit counter from the time of the sampling each time.

At time t4, the UART data of bit7 is sampled. In this case, the low level is sampled, and the shift register stores "xxxxxxx0". The above "x" indicates an indefinite state. After that, the similar operation is performed from time t5 to t10, so as to sample bit7 to bit1 of the low level.

At time t11, the UART data is raised from the low level to the high level. At this time, the data reception unit 101 resets the counter according to the rising edge, and operates (re-starts) the sampling counter and the bit counter again after the reset. The sampling timing after the re-start does not include the sampling error by the oscillation stable time as described above. Therefore, the sampling of bit0, parity bit (P), and stop bit (SP) performed by the data reception unit 101 after time t11 may be performed by the normal sampling timing (time t12, t13, . . . ) that is not influenced by the delay period $Td1y$.

As described above, using the rising edge from Low to High that is definitely occurred in one UART, the sampling error by the oscillation stable period of the oscillator 103 is corrected. Note that this correction is executed only on the first UART data after the operation of the oscillator 103. This is because, when the UART data is continuously input, the CPU 105 keeps the operation processing, the chip state is kept RUN, and the oscillator 103 does not stop.

Figure 22:
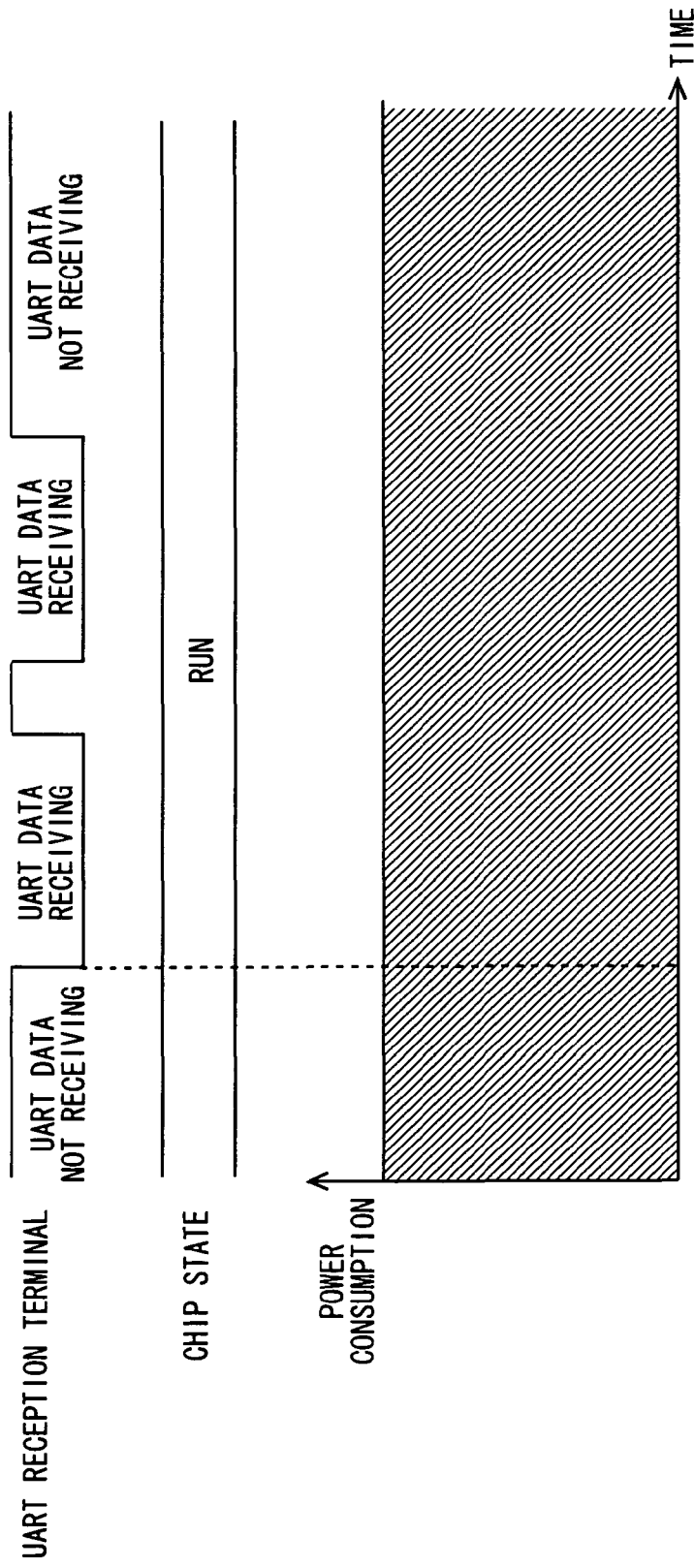
FIG. 22 is a timing chart for describing a problem according to a prior art.
Figure 23:
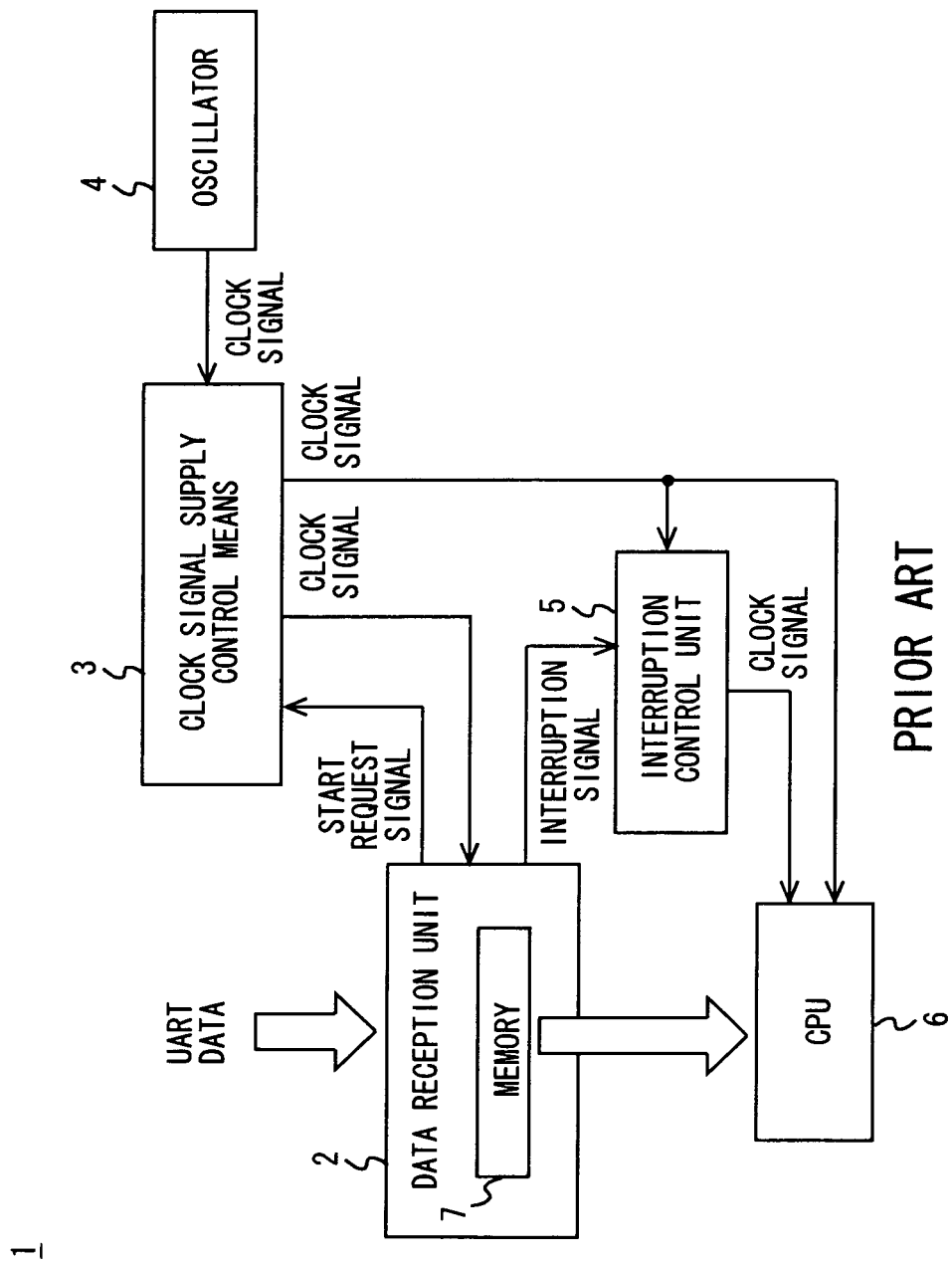
FIG. 23 is a block configuration according to a related art.
Figure 24:
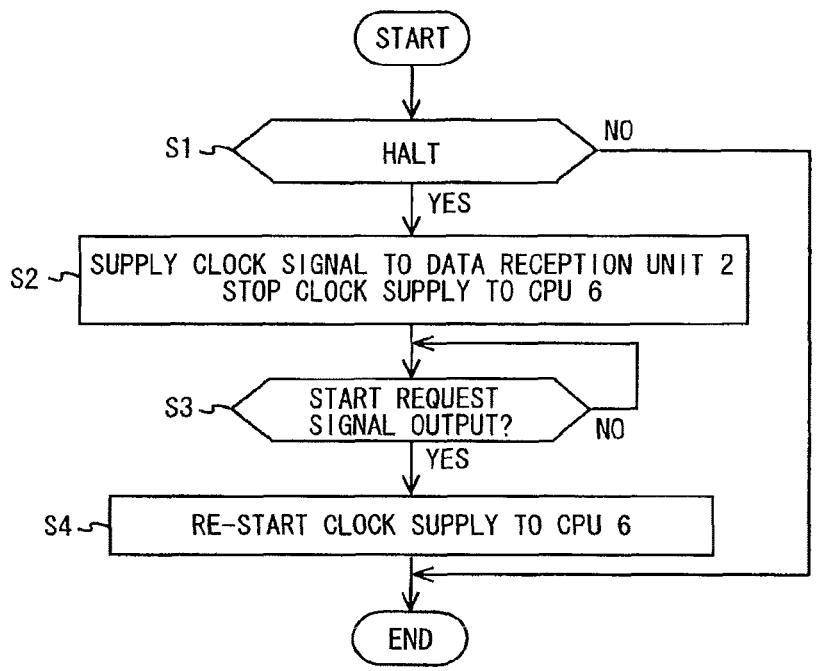
FIG. 24 is a flow chart for describing an operation according to the prior art.
Figure 25:
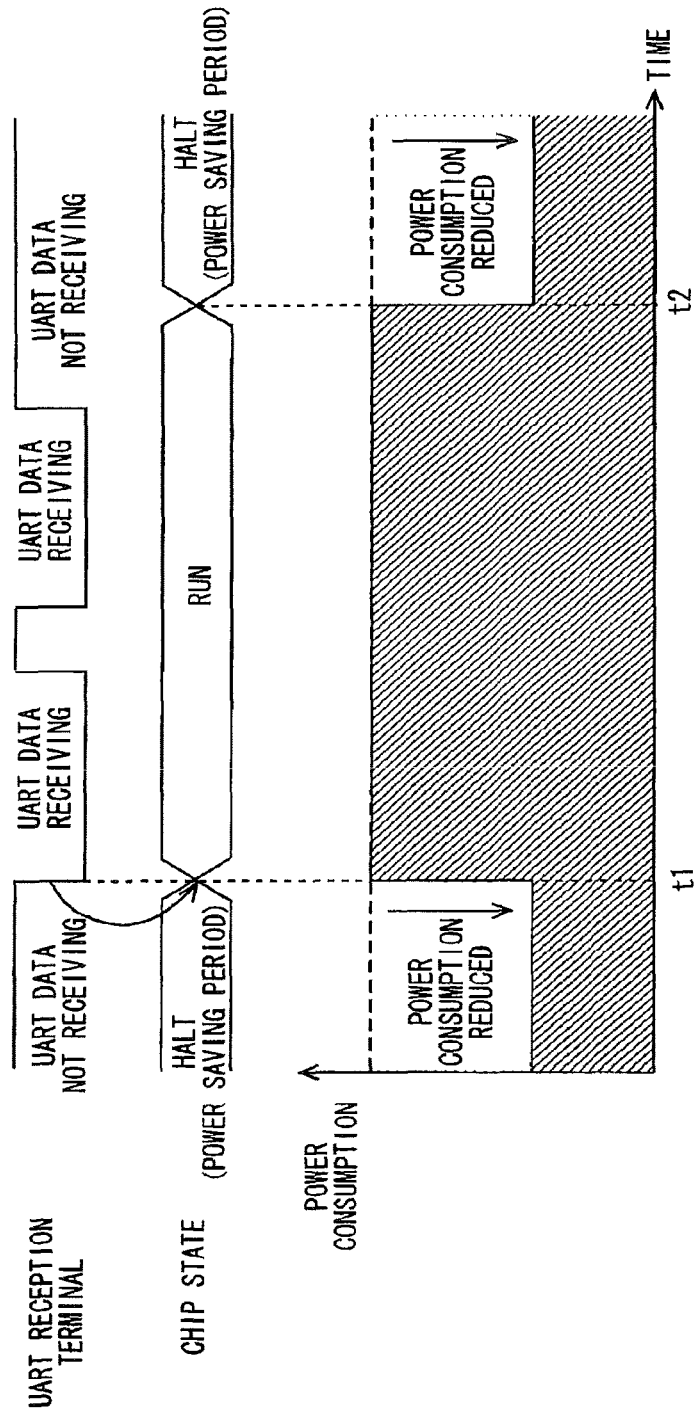
FIG. 25 is a timing chart for describing the operation according to the prior art.

In the related microcontroller, the RUN state needs to be constantly maintained in order to address with the UART data input at arbitrary timings. Accordingly, as shown in FIG. 22, the electric power is constantly consumed even in the period in which the UART data is not received, which makes it difficult to reduce the power consumption. Further, since an oscillator 4 needs to constantly operate also in a reception system 1 in FIG. 23, the electric power is consumed to achieve the operation. Accordingly, although power consumption can be reduced in FIG. 25 compared to FIG. 22, further reduction in power consumption is difficult.

The microcontroller 100 according to the first embodiment stops the oscillator 103 when the chip state is STOP. Upon receiving the UART data, the microcontroller 100 operates the oscillator 103 by the start request signal, and makes the chip state transit to SNOOZE. While the chip state is SNOOZE, the operation clock signal is not supplied and the operation of the CPU 105 is stopped, and the operation clock signal is supplied to the data reception unit 101 (and interruption control unit 104) for the operation. After that, when the reception of the UART data is completed, the data reception unit 101 supplies the reception end interruption signal, and the chip state becomes RUN. When the chip state is RUN, the operation clock signal is supplied, and the CPU 105 starts the operation.

Figure 10:
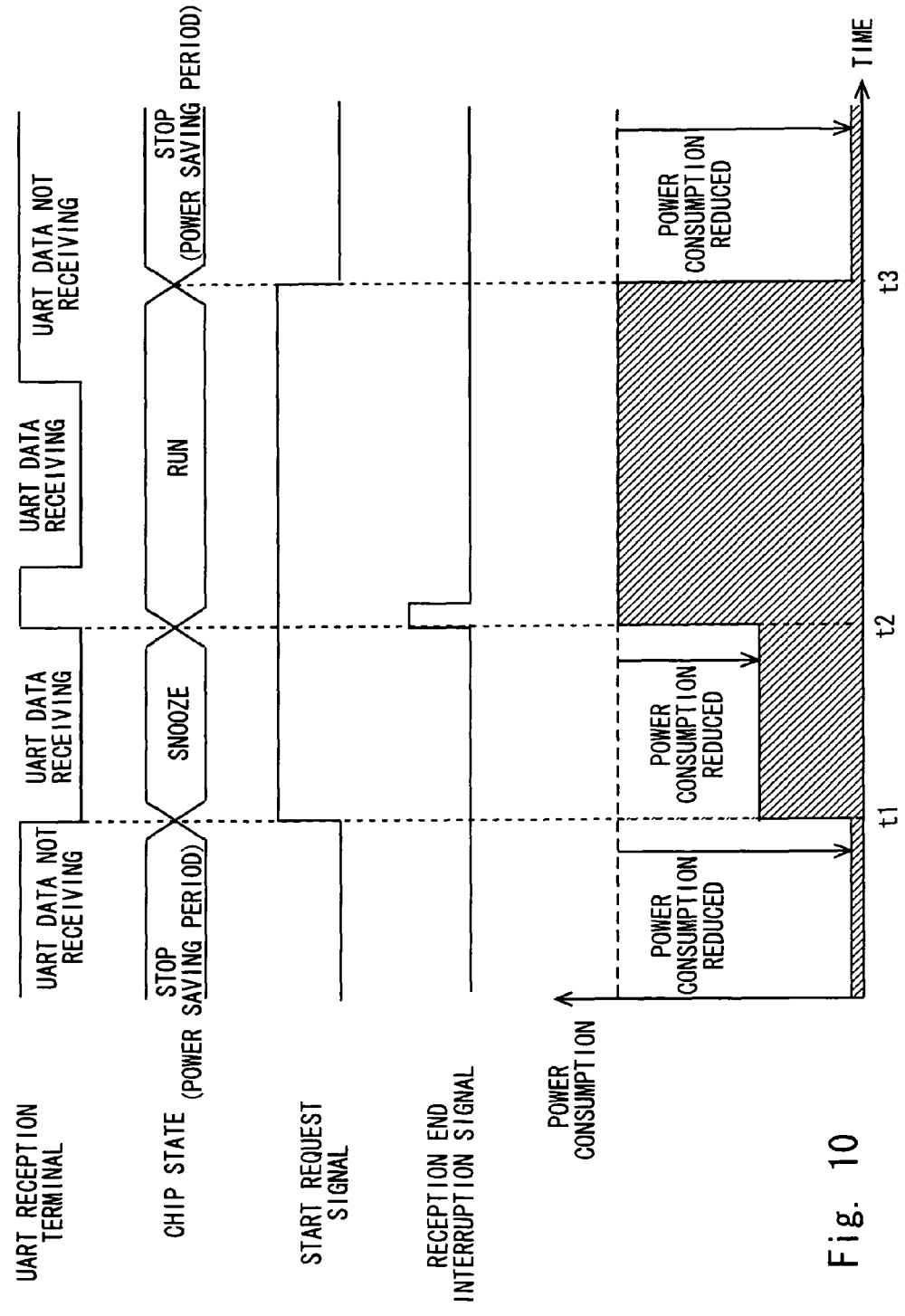
FIG. 10 is a timing chart for describing an effect of the microcontroller according to the first embodiment of the present invention.

Accordingly, the microcontroller 100 according to the first embodiment also stops the oscillator 103 that supplies the operation clock signal when the chip state is STOP (before time t1) as shown in FIG. 10, whereby it is possible to dramatically reduce the power consumption.

When the UART data is received and the chip state becomes SNOOZE (from time t1 to t2), the data reception unit 101 (and interruption control unit 104) operates but the operation of the CPU 105 is stopped. Thus, from time t1 to t2, the power consumption is not maximum, and the power consumption of the CPU 105 is reduced. Hence, compared with the reception system 1 according to the prior art, further reduction in power consumption can be possible according to the first embodiment.

Second Embodiment

Figure 11:
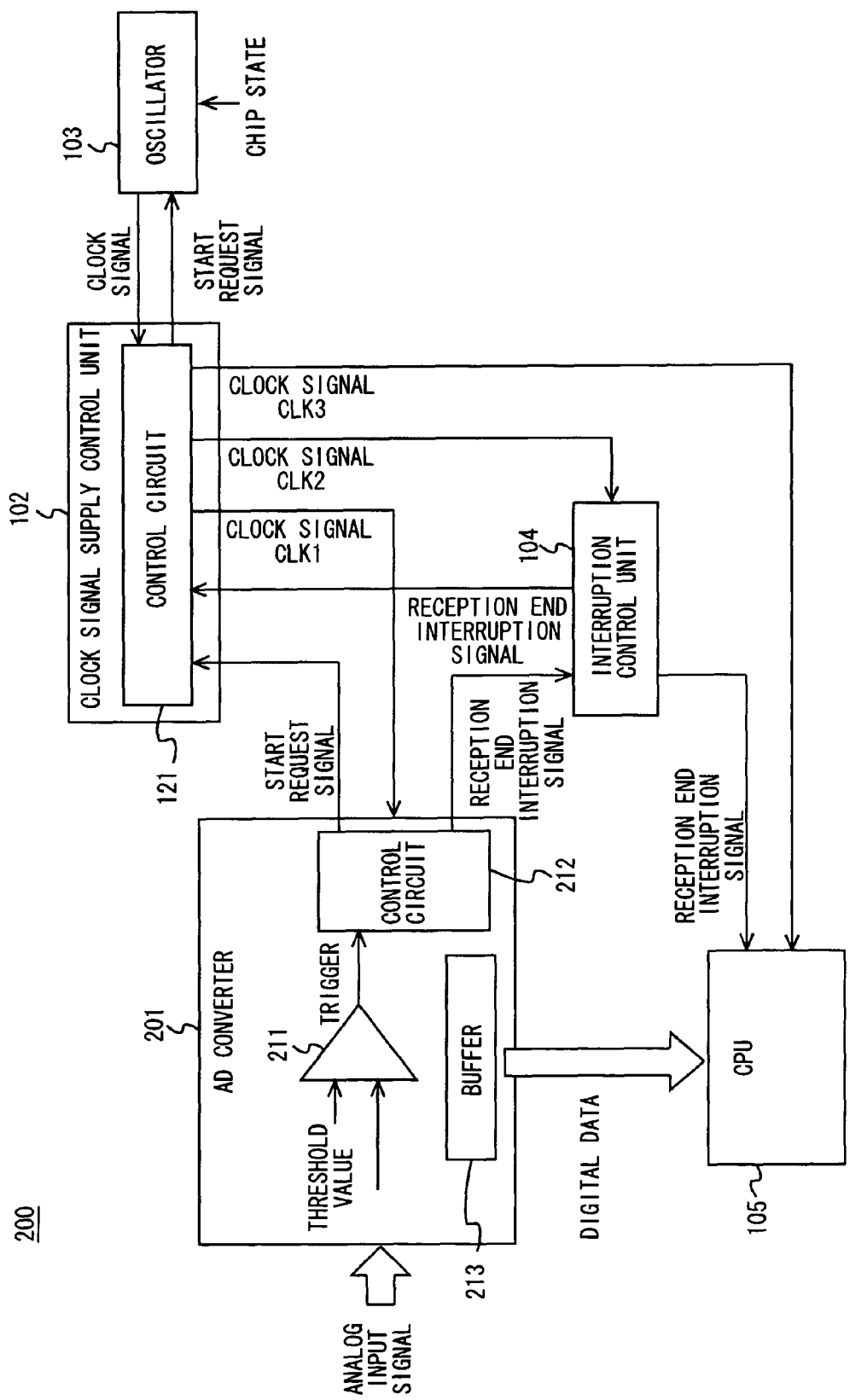
FIG. 11 is a block configuration of a microcontroller according to a second embodiment of the present invention.

Hereinafter, a specific second embodiment of the present invention is described in detail with reference to the accompanying drawings. In the second embodiment, the present invention is applied to a microcontroller having an AD converting function. FIG. 11 shows a block configuration of a microcontroller 200 according to the second embodiment.

As shown in FIG. 11, the microcontroller 200 includes an AD converter 201, a clock signal supply control unit 102, an oscillator 103, an interruption control unit 104, and a CPU 105. In FIG. 11, the configurations that are denoted by the same reference symbols as those shown in FIG. 1 show the same or similar components as FIG. 1. The second embodiment is different from the first embodiment in that input data changes from the UART data to an analog signal that has no limitation and the data reception unit 101 is replaced with the AD converter 201. In the second embodiment, the differences from the first embodiment are mainly described, and description will be omitted of the other similar parts as those in the first embodiment unless otherwise needed.

The AD converter 201 includes a comparator 211, a control circuit 212, and a buffer 213. The AD converter 201 converts an analog input signal to a digital data signal according to a clock signal CLK1. The digital data that is converted is stored in the buffer 213.

The comparator 211 receives the voltage of the analog input signal and a threshold value determined by a reference voltage or the like, and compares them. The result of comparing them is transmitted to the control circuit 212 as a start trigger signal. For example, when the voltage of the analog input signal exceeds or is below the reference voltage that defines the threshold value, the start trigger signal is output from the comparator.

The control circuit 212 performs the similar operation as the control circuit 112 according to the first embodiment. However, as is different from the first embodiment, the output of the start request signal is performed based on the start trigger signal. Further, upon completion of conversion from the analog input signal to the digital data signal, the control circuit 212 outputs a conversion end interruption signal instead of the reception end interruption signal according to the first embodiment.

Note that the conversion end interruption signal and the reception end interruption signal according to the first embodiment are both interruption signals supplied at the time of the operation end, and basically the similar signal. Further, as is similar to the first embodiment, the state in which the oscillator 103 does not supply the clock signal is expressed as "the chip state being STOP", and the state in which the clock signal is supplied to the CPU 105 for the operation is expressed as "the chip state being RUN". Further, the state in which the clock signal is supplied to the AD converter 201 and the interruption control unit 104 for operation, but the clock signal is not supplied to the CPU 105 and the CPU 105 stops the operation, is expressed as "the chip state being SNOOZE".

Figure 12:
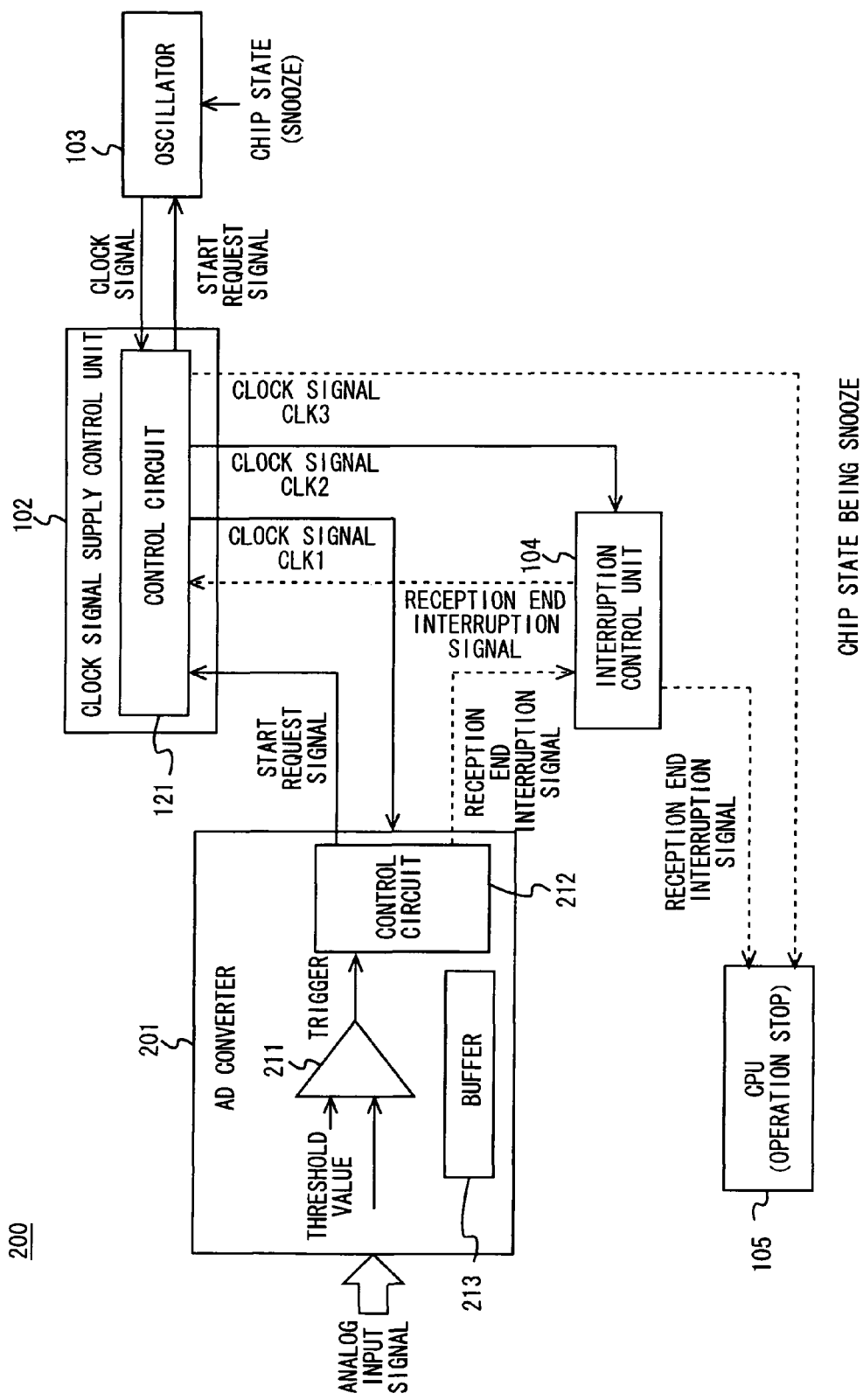
FIG. 12 is a block configuration diagram for describing an operation of the microcontroller according to the second embodiment of the present invention.

A basic operation of the microcontroller 200 is described with reference to FIGS. 12 and 13. Note that the start trigger signal is output when the analog input signal exceeds the threshold value. First, as shown in FIG. 12, the AD converter 201 outputs the high-level start request signal, for example, when the voltage of the analog input signal increases and exceeds the threshold value. The control circuit 121 of the clock signal supply control unit 102 outputs the start request signal to the oscillator 103, and the oscillator 103 starts supply of the clock signal.

The clock signal supply control unit 102 supplies the clock signal supplied from the oscillator 103 to the AD converter 201 as a clock signal CLK1, and to the interruption control unit 104 as a clock signal CLK2. Then, the AD converter 201 starts the operation upon receiving the clock signal CLK1 as the operation clock, and the interruption control unit 104 starts the operation upon receiving the clock signal CLK2 as the operation clock.

As shown in FIG. 12, when the oscillator 103 starts the operation, the clock signal is supplied to the AD converter 201 and the interruption control unit 104, but the clock signal is not supplied to the CPU 105. Thus, the chip state becomes SNOOZE.

Figure 13:
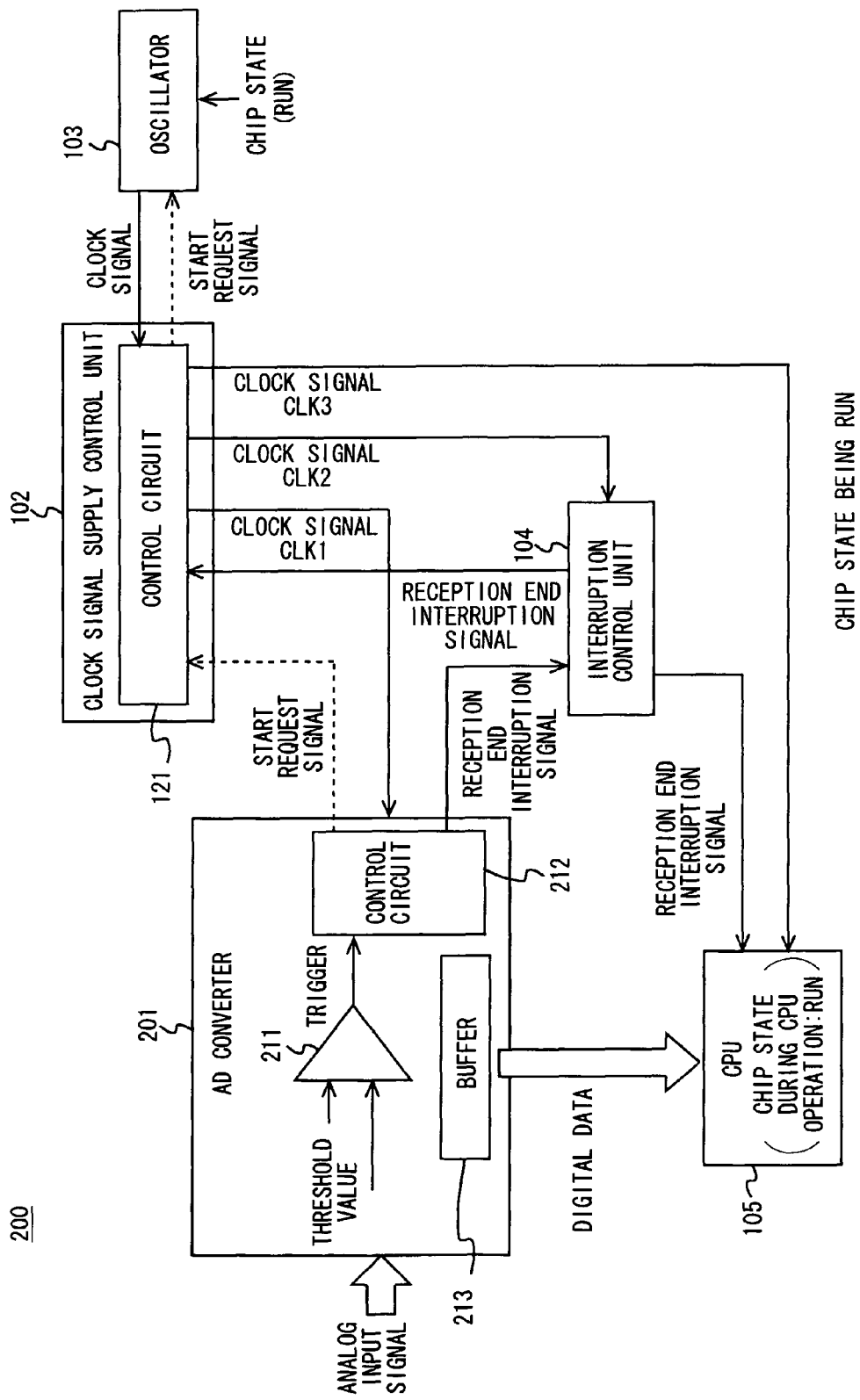
FIG. 13 is a block configuration diagram for describing the operation of the microcontroller according to the second embodiment of the present invention.

Next, as shown in FIG. 13, when the AD converter 201 completes conversion of the analog input signal to the digital data, the AD converter 201 outputs the conversion end interruption signal to the interruption control unit 104. Further, the AD converter 201 stops the output of the start request signal. The interruption control unit 104 outputs the conversion end interruption signal from the AD converter 201 to the CPU 105 and the control circuit 121 of the clock signal supply control unit 102.

When the control circuit 121 of the clock signal supply control unit 102 receives the conversion end interruption signal, the clock signal supply control unit 102 supplies the clock signal supplied from the oscillator 103 to the CPU 105 as a clock signal CLK3. The CPU 105 starts the operation by the conversion end interruption signal supplied from the interruption control unit 104, and processes the digital data read out from the buffer 213 of the AD converter 201 according to the clock signal CLK3.

Since the AD converter 201 stops the output of the start request signal, the start request signal received by the oscillator 103 is stopped as well. However, since the CPU 105 operates and the chip state is RUN, the oscillator 103 does not stop supply of the clock signal.

When the CPU 105 completes all the processing, the CPU 105 sets the chip state to STOP. In this case, since the oscillator 103 does not receive the start request signal, the oscillator 103 stops the operation. Therefore, the AD converter 201, the interruption control unit 104, and the CPU 105 also stop the operation.

Figure 14:
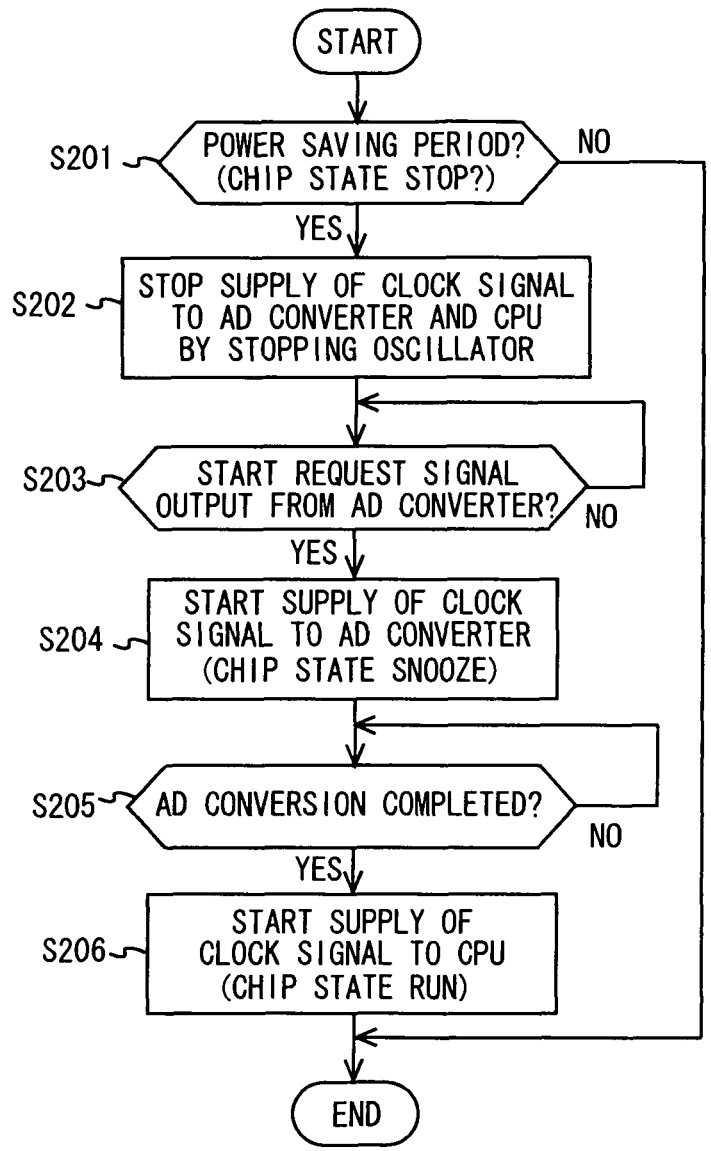
FIG. 14 is a flow chart for describing the operation of the microcontroller according to the second embodiment of the present invention.

Next, FIG. 14 shows a flow chart for describing the operation of the microcontroller 200. As shown in FIG. 14, in the power saving period (chip state being STOP) (YES in S201), the oscillator 103 stops, and the supply of the clock signal to the AD converter 201, the CPU 105, and the interruption control unit 104 is stopped (S202).

When the analog input signal received by the AD converter 201 exceeds the threshold value and the start request signal is output (YES in S203), the supply of the clock signal to the AD converter 201 and to the interruption control unit 104 is started (S204). Since there is no supply of the clock signal to the CPU 105 in this state, the chip state is SNOOZE.

When the AD converter 201 completes conversion of the analog input signal to the digital data (YES in S205), the supply of the clock signal to the CPU 105 is started (S206). In summary, the chip state becomes RUN.

Figure 15:
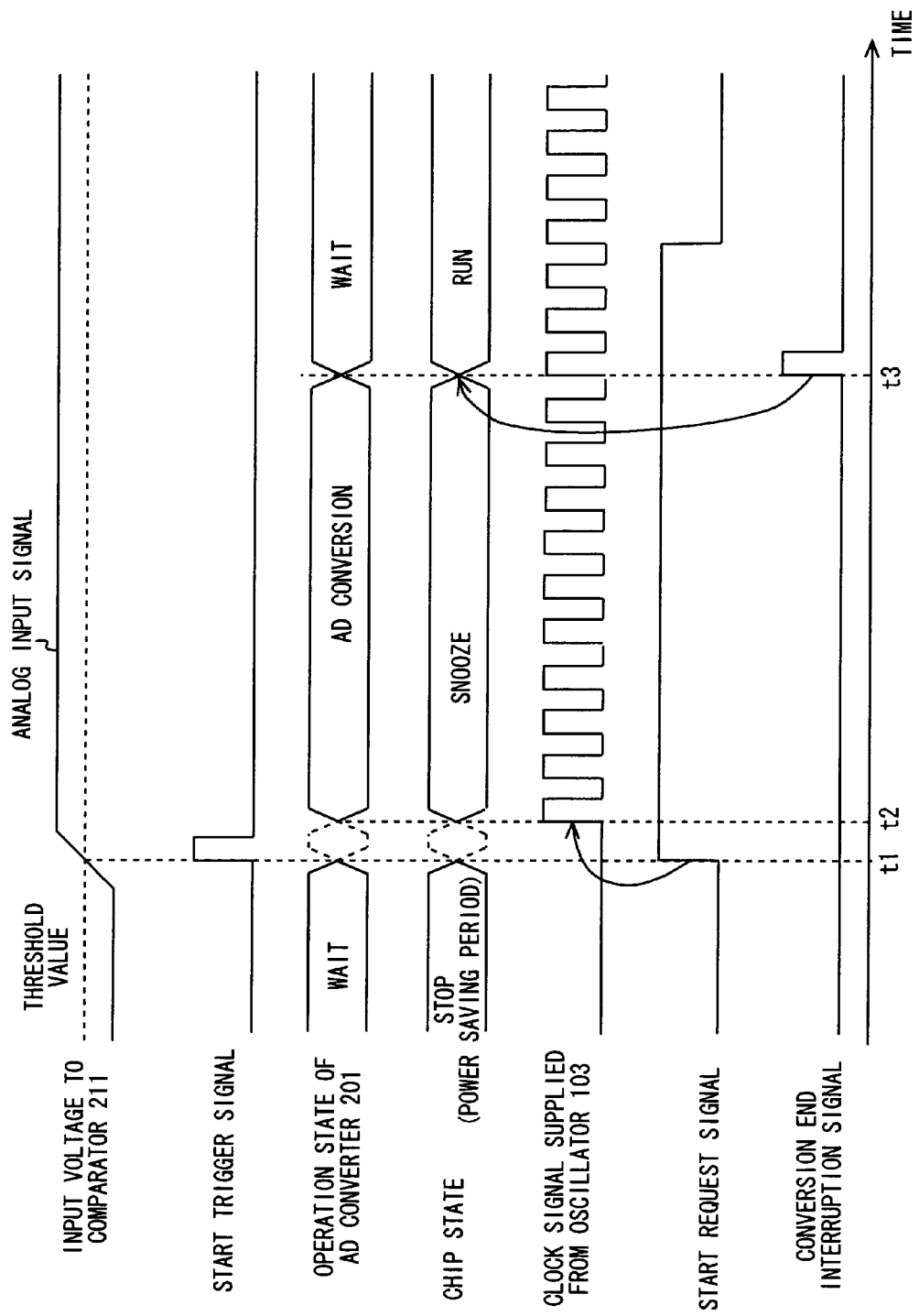
FIG. 15 is a timing chart for describing the operation of the microcontroller according to the second embodiment of the present invention.

Next, FIG. 15 is a timing chart for describing the operation of the microcontroller 200. As shown in FIG. 15, before time t1, with the state in which the analog input signal input to the AD converter 201 does not exceed the threshold value, the AD converter 201 does not perform AD conversion operation, but in a state of waiting for conversion. Thus, the chip state is in the state of STOP, and the oscillator 103 does not supply the clock signal.

When the analog input signal input to the AD converter 201 exceeds the threshold value at time t1, the comparator 211 outputs the start trigger, and the control circuit 212 raises the start request signal from the low level to the high level. This high-level start request signal is supplied to the oscillator 103, and at time t2, the oscillator 103 starts the supply of the clock signal. Then, the clock signal CLK1 is supplied from the clock signal supply control unit 102 to the AD converter 201. Further, the clock signal CLK2 is supplied to the interruption control unit 104.

From time t2 to t3, upon receiving the clock signal CLK1, the AD converter 201 converts the analog input signal to the digital data. This digital data is held in the buffer 213. From time t2 to t3, the chip state becomes SNOOZE.

At time t3 when the AD converter 201 completes the AD conversion operation, the AD converter 201 outputs the conversion end interruption signal. According to the conversion end interruption signal, the clock signal supply control unit 102 supplies the clock signal CLK3 to the CPU 105. The CPU 105 starts the operation according to the clock signal CLK3, and performs processing on the digital data of the buffer 213.

Furthermore, as is similar to the first embodiment, the oscillation stable time of the oscillator 103 is made shorter than the operation start time of the AD converter 201, thereby making it possible to perform AD conversion of the analog input signal supplied at time t1.

As stated above, the microcontroller 200 according to the second embodiment stops the oscillator 103 in the state of waiting for conversion of the analog signal, which is the period in which the chip state is STOP, thereby making it possible to reduce power consumption. Further, after completion of AD conversion, in the period in which the chip state is RUN, the CPU 105 is started. Since the CPU 105 does not operate in the period of SNOOZE from STOP to RUN, power consumption can be reduced. As described above, the present invention can be applied to other systems than the UART system according to the first embodiment, as the microcontroller 200 according to the second embodiment, and power consumption can be reduced compared with the related art.

Third Embodiment

Figure 16:
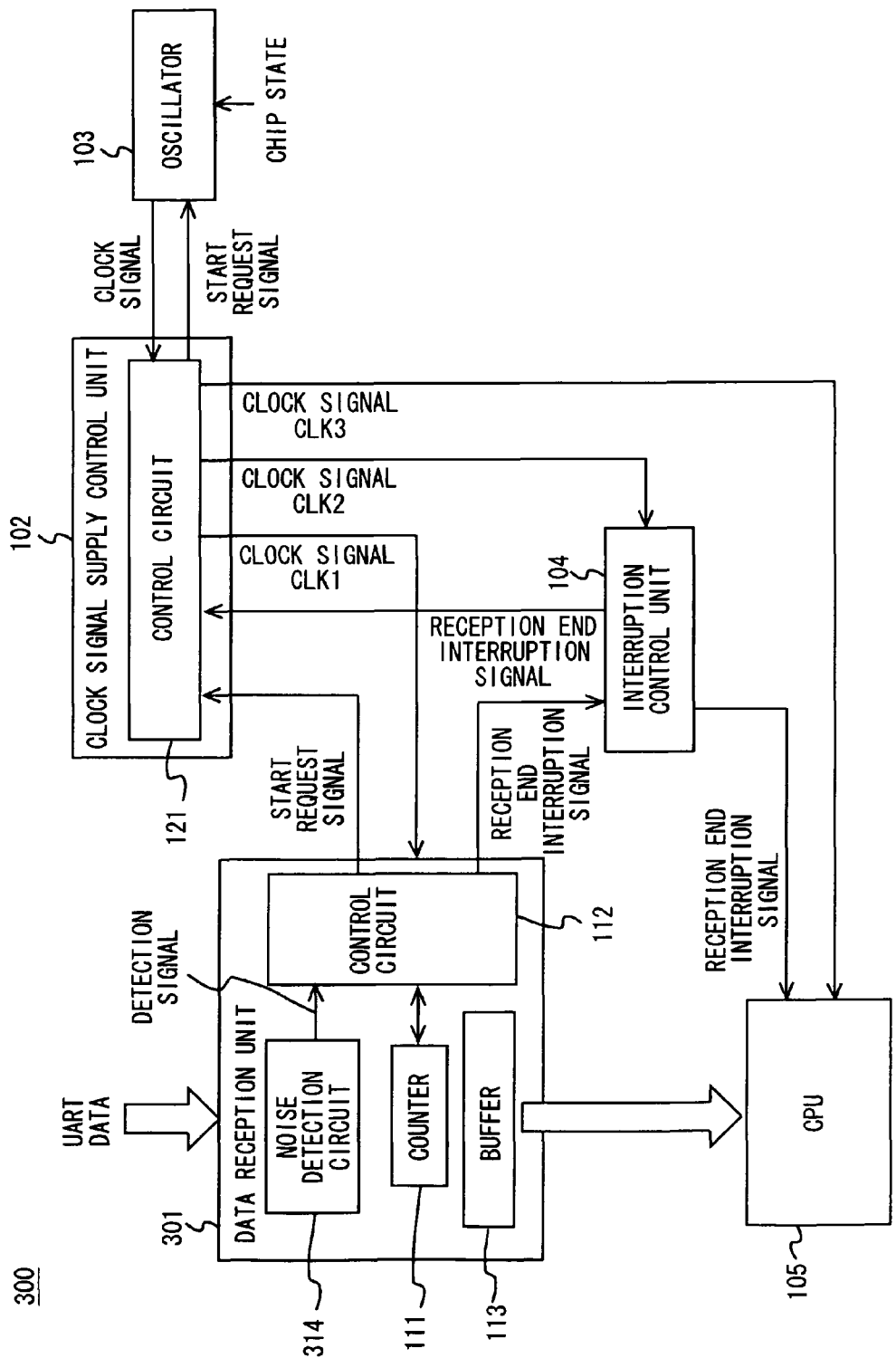
FIG. 16 is a block configuration of a microcontroller according to a third embodiment of the present invention.

A specific third embodiment of the present invention is described in detail with reference to the accompanying drawings. In the third embodiment, as is similar to the first embodiment, the present invention is applied to a microcontroller including a reception system of UART. FIG. 16 shows a block configuration of a microcontroller 300 according to the third embodiment.

As shown in FIG. 16, the microcontroller 300 includes a data reception unit 301, a clock signal supply control unit 102, an oscillator 103, an interruption control unit 104, and a CPU 105.

The data reception unit 301 includes a counter 111, a control circuit 112, a reception buffer 113, and a noise detection circuit 314.

In FIG. 16, the components that are denoted by the same reference symbols as those shown in FIG. 1 show the same or similar components as FIG. 1.

The third embodiment is different from the first embodiment in that the data reception unit 301 includes the noise detection circuit 314 in the third embodiment. In the third embodiment, the differences from the first embodiment are mainly described, and description will be omitted of the other similar parts as those in the first embodiment unless otherwise needed.

When the data reception unit 301 receives noise instead of UART data, the noise detection circuit 314 detects the reception of the noise, transmits a detection signal to the clock signal supply control unit 102, and stops the output of the start request signal from the control circuit 112. It is judged whether the input to the data reception unit 301 is the UART data or noise by judging whether the value of the UART data is high level or low level at the rising edge of the first clock signal CLK1 received by the data reception unit 301, for example.

For example, when the value of the UART data is the low level at the rising edge of the first clock signal CLK1, it is judged that a UART reception terminal receives the normal UART data. In contrast, when the value of the UART data is the high level at the rising edge of the first clock signal CLK1, it is judged as the noise since it is short as the start bit of the UART data.

Figure 17:
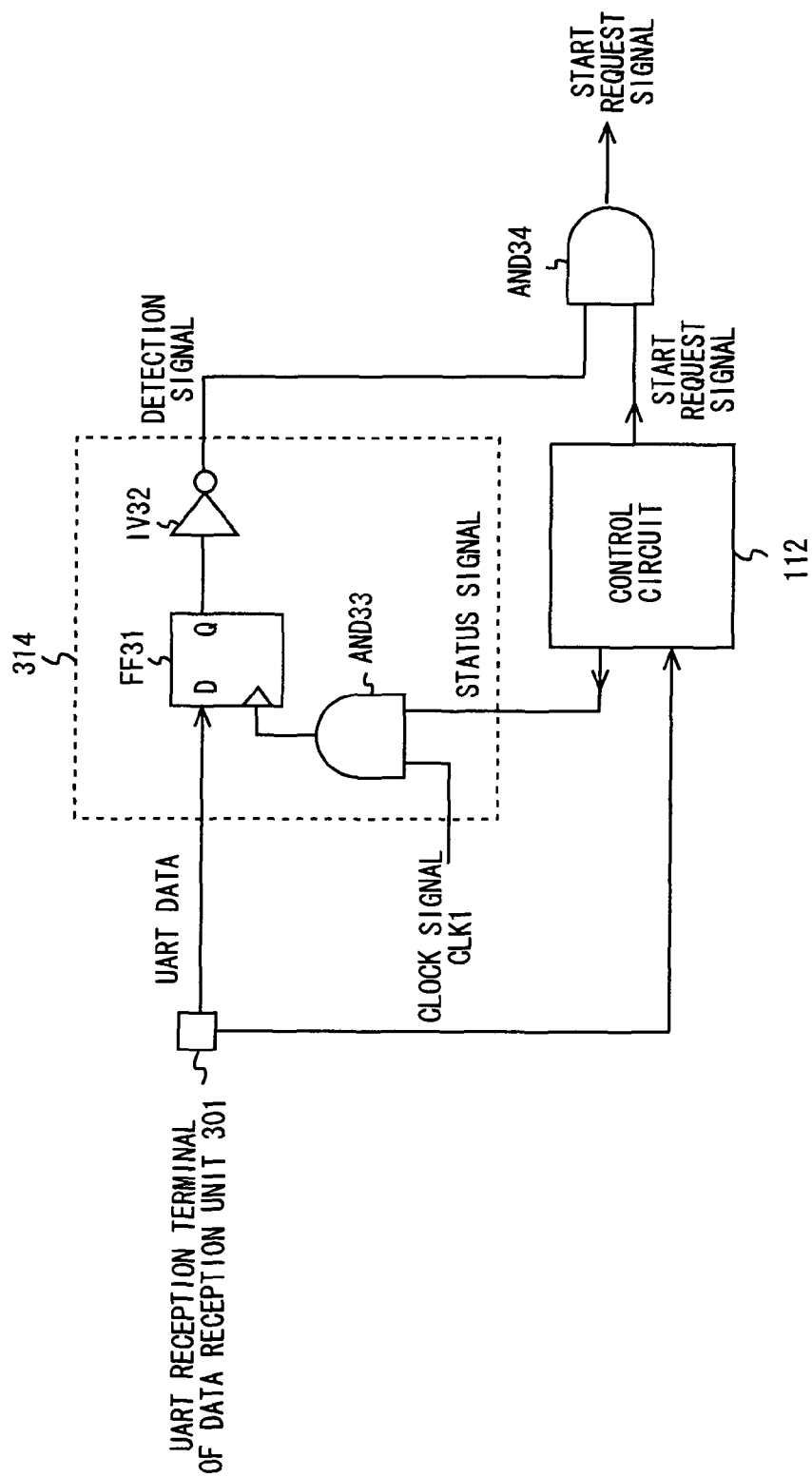
FIG. 17 is a diagram for describing a configuration of a noise detection circuit, and a connection relation between the noise detection circuit and peripheral circuits according to the third embodiment of the present invention.

FIG. 17 shows an example of a configuration of the noise detection circuit 314, and a relation between the noise detection circuit 314 and peripheral circuits including the control circuit 112. Note that this is merely an example, and may have other configurations as long as it includes the similar function.

As shown in FIG. 17, the noise detection circuit 314 includes a flip-flop FF31, an inverter circuit IV32, and an AND circuit AND 33.

The flip-flop FF31 has a data input terminal D connected to a UART reception terminal of the data reception unit 301, and a clock input terminal connected to an output terminal of the AND circuit AND 33. Further, a data output terminal Q is connected to an input terminal of the inverter circuit IV32. Thus, the flip-flop FF31 latches a value of data applied to the data input terminal D according to the rising edge of the signal output from the AND circuit AND 33, so as to output the value from the data output terminal Q.

The inverter circuit IV32 receives the signal output from the data output terminal Q of the flip-flop FF31, and outputs a signal obtained by inverting the signal as a detection signal.

The AND circuit AND 33 has one input terminal that receives the clock signal CLK1, and the other input terminal that receives a status signal output from the control circuit 112. Then, the AND circuit AND 33 supplies the operation result to the clock input terminal of the flip-flop FF31. Accordingly, when the status signal is in the high level, the AND circuit AND 33 outputs the clock signal CLK1 to the clock input terminal of the flip-flop FF31; when the status signal is in the low level, the AND circuit AND 33 outputs a low-level fixed value to the clock input terminal of the flip-flop 31.

In this example, the control circuit 112 supplies the start request signal to the clock signal supply control unit 102 through an AND circuit AND 34. The AND circuit AND 34 has one input terminal that receives the detection signal output from the inverter circuit IV32, and the other input terminal that receives the start request signal output from the control circuit 112. Thus, when the detection signal is in the high level, the AND circuit AND 34 directly supplies the start request signal supplied from the control circuit 112; when the detection signal is in the low level, the AND circuit AND 34 fixes the start request signal to the value of the low level.

The control circuit 112 has a function to switch the status signal from the high level to the low level when the clock signal CLK1 is input for more than a predetermined number of times (e.g., one clock) in this example.

Figure 18:
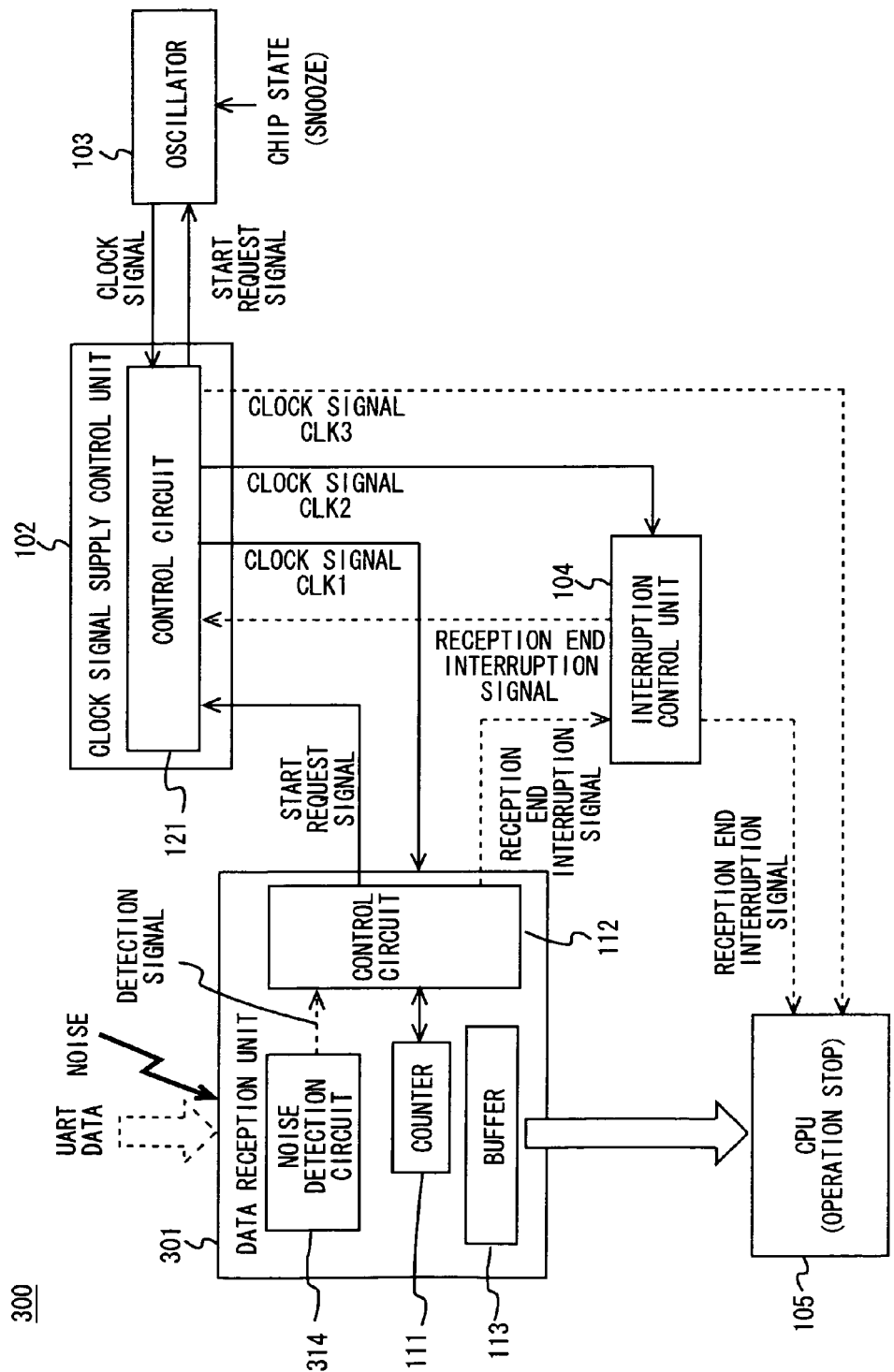
FIG. 18 is a block configuration diagram for describing an operation of the microcontroller according to the third embodiment of the present invention.
Figure 19:
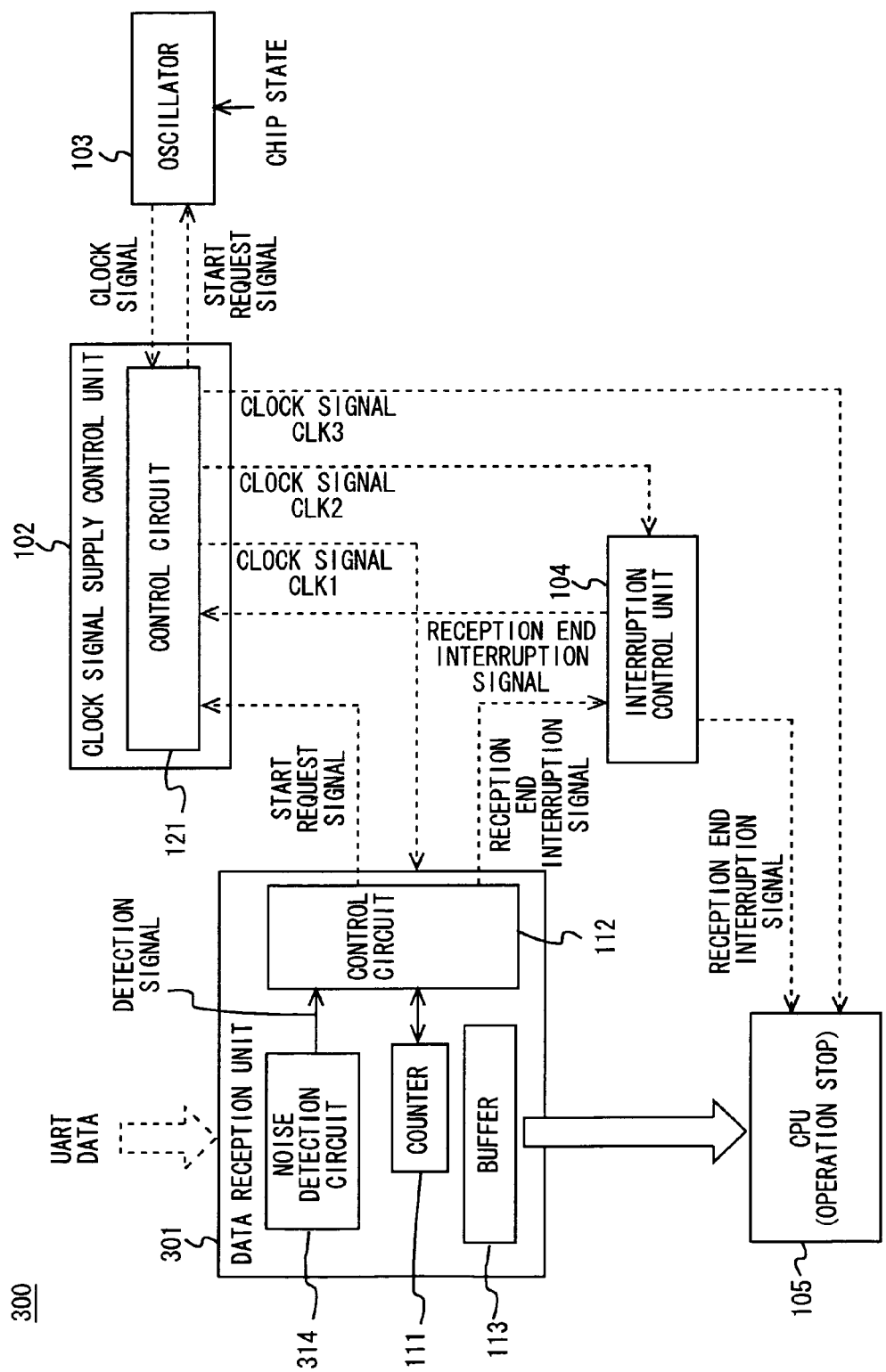
FIG. 19 is a block configuration diagram for describing the operation of the microcontroller according to the third embodiment of the present invention.

Referring to FIGS. 18 and 19, an operation will be described in which the microcontroller 300 receives noise instead of receiving UART data. First, as shown in FIG. 18, when receiving noise, the data reception unit 301 supplies the high-level start request signal as is similar to the case in which it receives the UART data. The control circuit 121 of the clock signal supply control unit 102 supplies the start request signal to the oscillator 103, and the oscillator 103 starts the supply of the clock signal. Then, as is similar to the first embodiment, the clock signal supply control unit 102 supplies the clock signal supplied from the oscillator 103 to the data reception unit 301 as a clock signal CLK1, and supplies the clock signal to the interruption control unit 104 as a clock signal CLK2.

At this point, while the clock signal is supplied to the data reception unit 301 and to the interruption control unit 104, it is not supplied to the CPU 105. Thus, the chip state becomes SNOOZE.

Next, as shown in FIG. 19, since the data reception unit 301 receives noise, the start request signal from the control circuit 112 is stopped (low level output). Since the chip state is not RUN but SNOOZE at this point, the oscillator 103 stops the supply of the clock signal. Accordingly, the supply of the clock signals CLK1 and CLK2 to the data reception unit 301 and the interruption control unit 104 is stopped as well, and thus the chip state becomes STOP.

Figure 20:
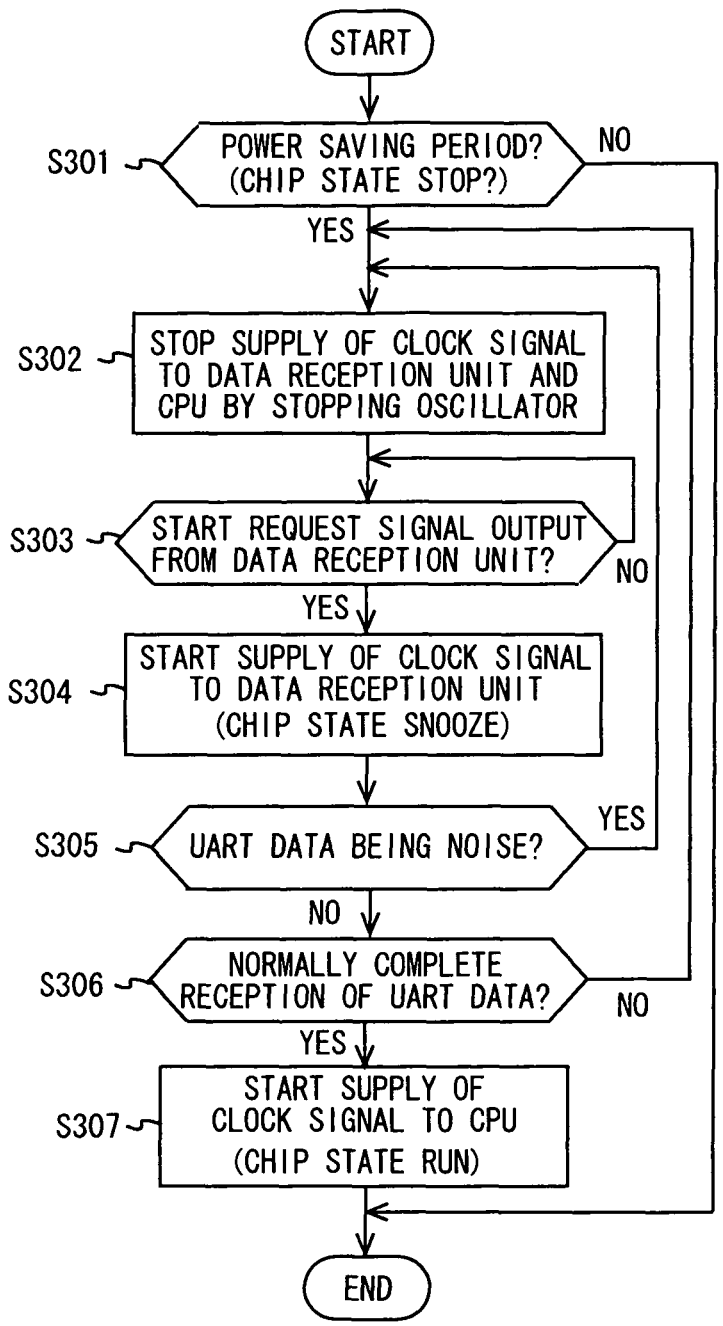
FIG. 20 is a flow chart for describing the operation of the microcontroller according to the third embodiment of the present invention.

Next, FIG. 20 shows a flow chart that describes an operation of the microcontroller 300. As shown in FIG. 20, in the power saving period (chip state being STOP) (YES in S301), the oscillator 103 is stopped, and the supply of the clock signal to the data reception unit 301, the CPU 105, and the interruption control unit 104 is stopped (S302).

When the data reception unit 301 receives UART data or noise, and the start request signal is output (YES in S303), the supply of the clock signal to the data reception unit 301 and to the interruption control unit 104 is started (S304). In this state, the clock signal is not supplied to the CPU 105, and thus the chip state is SNOOZE.

Upon judgment that the data reception unit 301 receives noise instead of UART data (YES in S305), the supply of the clock signal to the CPU 105 is not started, and the process goes back to step S302. On the other hand, upon judgment that the data reception unit 301 receives the UART data instead of noise (NO in S305), the data reception unit 301 starts the UART data, as is similar to the first embodiment.

When the data reception unit 301 normally completes reception of the UART data (YES in S306), the supply of the clock signal to the CPU 105 is started (S307). In short, the chip state becomes RUN. When the data reception unit 301 does not normally complete reception of the UART data in step S306 (NO in S306), the supply of the clock signal to the CPU 105 is not started, and the process goes back to step S302.

Figure 21:
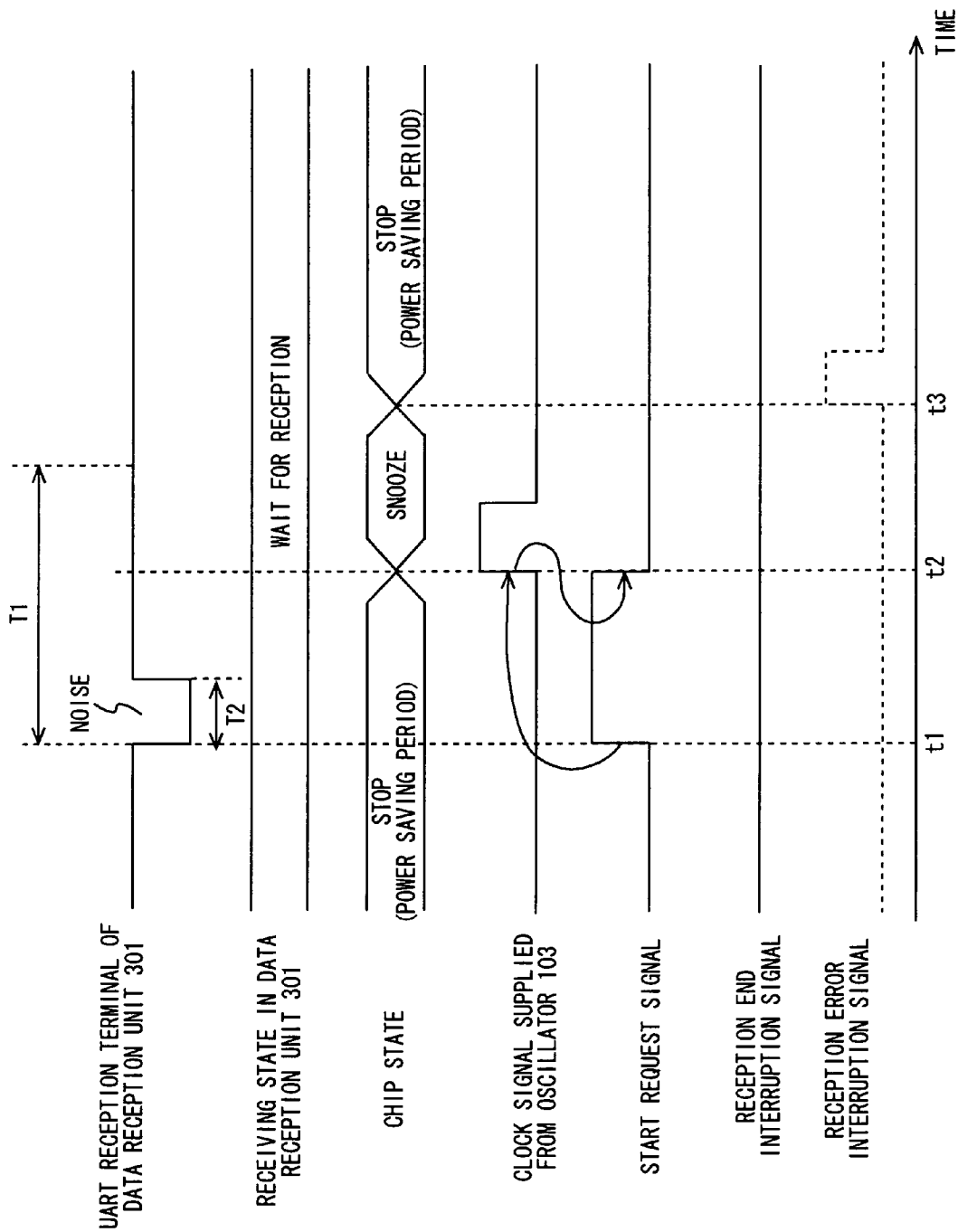
FIG. 21 is a timing chart for describing the operation of the microcontroller according to the third embodiment of the present invention.

Next, FIG. 21 shows a timing chart for describing the operation in which the microcontroller 300 receives noise instead of the UART data, As shown in FIG. 21, before time t1, the data reception unit 301 waits for reception of the UART data in the state in which the data reception unit 301 does not receive the UART data, as is similar to the first embodiment. Accordingly, the chip state is STOP, and the oscillator 103 does not supply the clock signal.

At time t1, the data reception unit 301 receives noise instead of the UART data. Upon detecting the low-level signal caused by noise, the data reception unit 301 raises the start request signal from the low level to the high level. This high-level start request signal is supplied to the oscillator 103, and at time t2, the oscillator 103 starts supply of the clock signal. Then, the clock signal CLK1 is supplied from the clock signal supply control unit 102 to the data reception unit 301. Further, the clock signal CLK2 is supplied to the interruption control unit 104.

However, while the start bit ST of the normal UART data becomes Low for the period of T1 that is specified, it becomes High at T2 which is shorter than T1 with the signal caused by noise.

Hence, for example, taking the example of the configuration shown in FIG. 17, at time t2, the flip-flop FF31 latches the high-level data at the rising edge of the clock signal CLK1, and outputs the high-level data to the inverter circuit IV32. Then, the low-level detection signal inverted by the inverter circuit IV32 is supplied to the AND circuit AND 34. Thus, the high-level start request signal output from the control circuit 112 through the AND circuit AND 34 is fallen to the low level, so that the data reception unit 301 stops the output of the start request signal. Accordingly, the oscillator 103 stops supply of the clock signal, and the supply of the clock signals CLK1 and CLK2 to the data reception unit 301 and the interruption control unit 104 is stopped as well. Thus, after time t3, the chip state becomes STOP. Thus, also in the microcontroller 300 according to the third embodiment, as is similar to the first embodiment, the reception error interruption signal is not output and the start request signal is stopped, thereby performing the following error processing.

When it is judged that the UART data input to the data reception unit 301 is noise, the microcontroller 300 according to the third embodiment stops the output of the start request signal at the first supply timing of the clock signal CLK1. Thus, it is possible to prevent misjudge that the noise is the start bit ST of the UART data and the state in which the oscillator 103 continues to supply the clock signal. Accordingly, it is possible to reduce power consumption with more accuracy compared with the first embodiment.

Note that the present invention is not limited to the embodiments described above, but may be changed as appropriate without departing from the spirit of the present invention.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A microcontroller comprising:
a data input unit that receives a first input data and outputs a start request signal upon receiving the first input data;
an oscillator that starts according to the start request signal, to generate a clock signal;
a clock signal supply control unit that outputs the start request signal supplied from the data input unit to the oscillator, and outputs a first clock signal and a second clock signal based on the clock signal; and
a CPU (central processing unit) that operates with the second clock signal,
wherein the data input unit receives the first input data without receiving the first clock signal from the clock signal supply control unit, the data input unit receives a second input data using a first clock signal and the clock supply control unit outputs the second clock signal to the CPU after the second input data is received by the data input unit.

2. The microcontroller according to claim 1, wherein
upon receiving the clock signal from the oscillator after receiving the start request signal, the clock signal supply control unit supplies the clock signal to the data input unit as the first clock signal,
the clock signal supply control unit then supplies the clock signal supplied from the oscillator to the CPU as the second clock signal when receiving a first interruption signal,
when the first clock signal is supplied, the data input unit starts a predetermined processing on the input data,
when the processing operation is normally completed, the data input unit supplies the first interruption signal to the clock signal supply control unit and the CPU, and upon receiving the first interruption signal, the CPU starts a processing operation according to the second clock signal that is supplied.

3. The microcontroller according to claim 2, wherein the oscillator stops the generation of the clock signal when the data input unit stops the output of the start request signal and the CPU completes the processing operation.

4. The microcontroller according to claim 2, wherein
the input data is UART data,
the data input unit is a data reception unit that receives the UART data,
upon receiving first UART data, the data input unit detects a start bit of the first UART data as the first data without an operational clock, and outputs the start request signal according to the detection result,
when the first clock signal is supplied, the data input unit stores the first UART data as the second data that is received in an internal buffer according to the first clock signal,
upon receiving a stop bit of the first UART data, the data input unit outputs the first interruption signal, and
upon receiving the first interruption signal, the CPU reads out the first UART data stored in the buffer according to the second clock signal, and performs a processing operation according to the data that is read out.

5. The microcontroller according to claim 4, wherein
the data input unit comprises a counter, performs sampling of the first UART data at a predetermined timing defined by the counter, and stores data of the sampling in the buffer, and
the data input unit re-starts the counter in synchronization with a rising edge in which the first UART data rises from a low level to a high level.

6. The microcontroller according to claim 4, wherein the first UART data is UART data that is first received by the data input unit when the oscillator is stopped.

7. The microcontroller according to claim 2, wherein
the input data is an analog signal,
the data input unit is an AD converter that converts an analog signal to digital data,
the data input unit outputs the starts request signal without an operational clock when the analog signal reaches a predetermined threshold value,
when the first clock signal is supplied, the data input unit converts the analog signal to the digital data as the second data according to the first clock signal, and stores the digital data in an internal buffer,
when conversion of the analog signal to the digital data is completed, the data input unit outputs the first interruption signal, and
upon receiving the first interruption signal, the CPU reads out the digital data stored in the buffer according to the second clock signal, and performs a processing operation according to the data that is read out.

8. The microcontroller according to claim 7, wherein
the data input unit comprises a comparator, and
the comparator compares the analog signal with a reference voltage that defines the threshold value, and outputs the start request signal according to the comparison result.

9. The microcontroller according to claim 8, wherein the comparator outputs the start request signal when the analog signal exceeds the threshold value or is below the threshold value.

10. The microcontroller according to claim 1, wherein
upon receiving the clock signal from the oscillator after receiving the start request signal, the clock signal supply control unit supplies the clock signal to the data input unit as the first clock signal,
the clock signal supply control unit then stops the output of the start request signal to the oscillator when receiving a second interruption signal,
the oscillator stops a generation of the clock signal when the clock signal supply control unit stops the output of the start request signal,
when the first clock signal is supplied, the data input unit starts a predetermined processing on the input data, and
when the processing operation is not normally completed, the data input unit outputs the second interruption signal to the clock signal supply control unit.

11. The microcontroller according to claim 10, wherein the input data is UART data, the data input unit is a data reception unit that receives the UART data, upon receiving first UART data, the data input unit detects a start bit of the first UART data as the first data without an operational clock, and outputs the start request signal according to the detection result, when the first clock signal is supplied, the data input unit stores the first UART data as the second data that is received in an internal buffer according to the first clock signal, and the data input unit outputs the second interruption signal when a reception error of the first UART data occurs.

12. The microcontroller according to claim 11, wherein the data reception unit further comprises a noise detection circuit, and when the noise detection circuit judges that the first UART data is noise, the data input unit stops the start request signal at a timing at which the first clock signal is supplied.

13. The microcontroller according to claim 1, wherein the oscillator is an oscillator embedded in the microcontroller, and a frequency accuracy is ±2% or less.

14. The microcontroller according to claim 1, wherein in a state in which there is no input data received by the data input unit, the oscillator does not generate the clock signal, and the CPU stops operation.

15. A method of controlling a microcontroller that comprises an oscillator, a data input unit, and a CPU (central processing unit), the method comprising:

outputting, by the data input unit, a start request signal, when the data input unit receives a first input data;

starting the oscillator according to the start request signal, to generate a clock signal;

operating the data input unit to receive a second input data using a first clock signal based on the clock signal; and supplying a second clock signal based on the clock signal to the CPU after the data input unit normally completes the operation, to perform processing according to the second input data when the CPU is operated, wherein the data input unit receives the first input data without receiving the first clock signal.

16. The method of controlling the microcontroller according to claim 15, wherein the oscillator stops the generation of the clock signal when the data input unit stops the output of the start request signal and the CPU completes the processing operation.

17. The method of controlling the microcontroller according to claim 15, wherein the oscillator stops the generation of the clock signal when the data input unit does not normally complete the operation.

18. The method of controlling the microcontroller according to claim 17, wherein the input data is UART data, the data input unit which is a receiving unit receiving the UART data detects, upon receiving first UART data, a start bit of the first UART data as the first data without an operational clock, and outputs the start request signal according to the detection result, when the first clock signal is supplied, the data input unit stores the first UART data as the second data that receives in an internal buffer according to the first clock signal, and when a reception error of the first UART data occurs, the input of the start request signal to the oscillator is stopped, and the oscillator stops the generation of the clock signal.

19. The method of controlling the microcontroller according to claim 18, wherein, when the data input unit judges that the first UART data is noise, the output of the start request signal is stopped at a timing at which the first clock signal is supplied.

20. The method of controlling the microcontroller according to claim 15, wherein the input data is UART data, the data input unit which is a receiving unit receiving the UART data detects, upon receiving first UART data, a start bit of the first UART data as the first input data without an operational clock, and outputs the start request signal according to the detection result, when the first clock signal is supplied, the data input unit stores the first UART data as the second data that receives in an internal buffer according to the first clock signal, upon receiving a stop bit of the first UART data, the data input unit outputs a first interruption signal, and upon receiving the first interruption signal, the CPU reads out the first UART data that is stored in the buffer according to the second clock signal that is supplied, and performs the processing operation according to the data that is read out.

21. The method of controlling the microcontroller according to claim 20, wherein the data input unit comprises a counter, samples the first UART data at a predetermined timing specified by the counter, and stores the data of the sampling in the buffer, and the data input unit re-starts the counter in synchronization with a rising edge in which the first UART data rises from a low level to a high level.

22. The method of controlling the microcontroller according to claim 20, wherein the first UART data is UART data that is first received by the data input unit when the oscillator is stopped.

23. The method of controlling the microcontroller according to claim 15, wherein the input data is an analog signal, the data input unit which is an AD converter converting an analog signal to digital data outputs the start request signal without an operational clock when the analog signal reaches a predetermined threshold value, when the first clock signal is supplied, the data input unit converts the analog signal to the digital data as the second data according to the first clock signal, and stores the digital data in an internal buffer, when conversion of the analog signal to the digital data is completed, the data input unit outputs a first interruption signal, and upon receiving the first interruption signal, the CPU reads out the digital data stored in the buffer according to the second clock signal that is supplied, and performs a processing operation according to the data that is read out.

24. The method of controlling the microcontroller according to claim 23, wherein the data input unit comprises a comparator, and the comparator compares the analog signal with a reference voltage that defines the threshold value, and outputs the start request signal according to the comparison result.

25. The method of controlling the microcontroller according to claim 24, wherein the comparator outputs the start request signal when the analog signal exceeds the threshold value or is below the threshold value.

26. The method of controlling the microcontroller according to claim 15, wherein the oscillator is an oscillator embedded in the microcontroller, and a frequency accuracy is ±2% or less.

27. The method of controlling the microcontroller according to claim 15, wherein in a state in which there is no input data received by the data input unit, the oscillator does not generate the clock signal, and the CPU stops operation.

28. A microcontroller comprising:
a data input unit that receives a first input data and outputs a start request signal upon receiving the first input data;
an oscillator that starts according to the start request signal, to generate a clock signal;
a clock signal supply control unit that outputs the start request signal supplied from the data input unit to the oscillator, and outputs a first clock signal and a second clock signal based on the clock signal; and
a CPU (central processing unit) that operates with the second clock signal,
wherein the data input unit receives a second input data using a first clock signal and the clock supply control unit outputs the second clock signal to the CPU after the second input data is received by the data input unit.

* * * * *